(12) United States Patent
Ohta et al.

(10) Patent No.: US 7,684,958 B2
(45) Date of Patent: Mar. 23, 2010

(54) STORAGE MEDIUM HAVING STEP COUNT CALCULATION PROGRAM STORED THEREIN, STEP COUNT CALCULATION APPARATUS, AND STEP COUNT CALCULATION SYSTEM

(75) Inventors: Keizo Ohta, Kyoto (JP); Kenta Sato, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 170 days.

(21) Appl. No.: 12/068,054

(22) Filed: Feb. 1, 2008

(65) Prior Publication Data
US 2009/0144020 A1 Jun. 4, 2009

(30) Foreign Application Priority Data
Nov. 30, 2007 (JP) ............................. 2007-310903

(51) Int. Cl.
G01C 22/00 (2006.01)
G01P 15/00 (2006.01)
(52) U.S. Cl. ..................... 702/160; 702/141
(58) Field of Classification Search ................. 702/127, 702/141, 142, 155, 158, 160; 73/488, 490, 73/511, 514.01, 514.02; 324/160, 161, 162; 700/63, 69, 188, 302; 463/3, 16, 29, 31, 463/32, 36, 37, 39, 43; 345/157, 158, 159
See application file for complete search history.

(56) References Cited

U.S. PATENT DOCUMENTS

| | | | |
|---|---|---|---|
| 5,574,479 A | 11/1996 | Odell | |
| 5,627,565 A | 5/1997 | Morishita et al. | |
| 6,301,964 B1* | 10/2001 | Fyfe et al. | ...................... 73/510 |
| 6,982,697 B2 | 1/2006 | Wilson et al. | |
| 7,139,983 B2 | 11/2006 | Kelts | |
| 7,158,118 B2 | 1/2007 | Liberty | |
| 7,262,760 B2 | 8/2007 | Liberty | |
| 7,292,151 B2 | 11/2007 | Ferguson et al. | |
| 7,414,611 B2 | 8/2008 | Liberty | |
| 2009/0018794 A1* | 1/2009 | Meriheina | ................... 702/141 |

FOREIGN PATENT DOCUMENTS

JP 2004-141669 5/2004

OTHER PUBLICATIONS

ADXL202 Specification Sheet: Low Cost ±2 g Dual Axis i MEMs® Accelerometer with Digital Output; Analog Devices, Inc., 1998.
ADXL330 Specification Sheet: Small, Low Power, 3-Axis ±3 g i MEMs® Accelerometer; Analog Devices, Inc., 2007.

(Continued)

*Primary Examiner*—Aditya Bhat
(74) *Attorney, Agent, or Firm*—Nixon & Vanderhye P.C.

(57) ABSTRACT

By repeatedly obtaining acceleration data, a gravity direction acceleration acting in a gravity direction of a housing and a horizontal direction acceleration acting in a horizontal direction perpendicular to the gravity direction are calculated. By using a first coefficient, a first step count in accordance with a change in the gravity direction acceleration is calculated and by using a second coefficient which is different from the first coefficient, a second step count in accordance with a change in the horizontal direction acceleration is calculated. Based on a predetermined condition, one of the first step count and the second step count is selected as a user's step count.

19 Claims, 19 Drawing Sheets

OTHER PUBLICATIONS

Pictures of Microsoft Xwand retrieved on May 13, 2009 from http://www.kf12.com/blogs/uploads/xwand.jpg and http://www.cs.cmu.edu/%7Edwilson/images/xwand.jpg.

Wilson, Andrew D., et al.; "Demonstration of the XWand Interface for Intelligent Spaces"; Microsoft Research; UIST '02 Companion; pp. 37-38.

Wilson, Daniel, et al.; "Gesture Recognition Using the XWand"; Robotics Institute; Carnegie Mellon University; tech report CMU-RI-TR-04-57; Apr. 2004.

Wilson, Andy, "XWand: UI for Intelligent Environments"; Apr. 26, 2004; retrieved May 12, 2009 from http://research.microsoft.com/en-us/um/people/awilson/wand/default.htm.

Wilson, Andrew, et al.; "XWand: UI for Intelligent Spaces"; Microsoft Research; CHI 2003, Apr. 5-10, 2003; Ft. Lauderdale, FL.

Selectech Air Mouse, Description; retrieved on May 5, 2009 from http://cgi.ebay.com.my/ws/eBayISAPI.dll?ViewItem&item=350096666675&indexURL.

* cited by examiner

F I G. 3
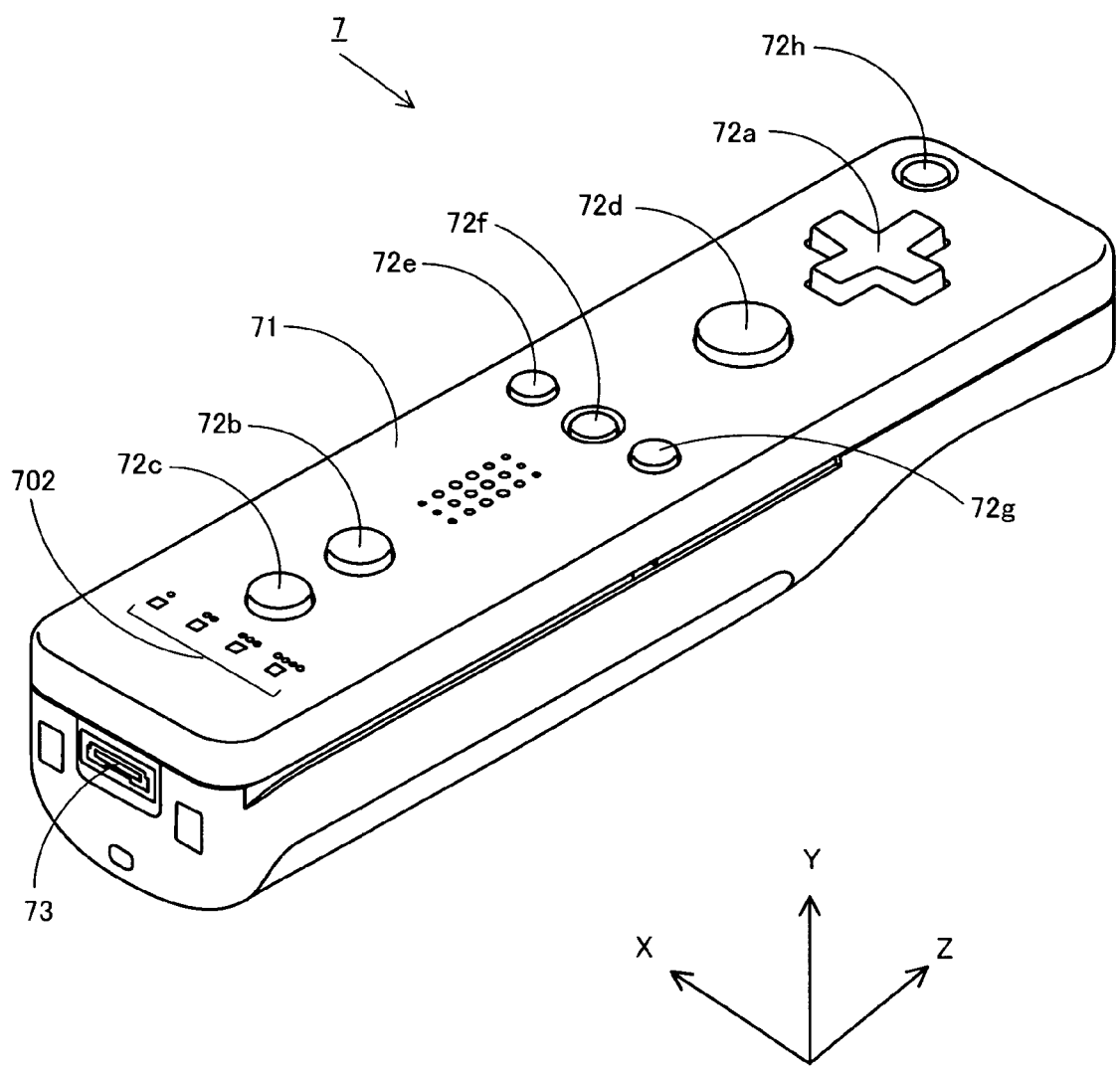

F I G. 5
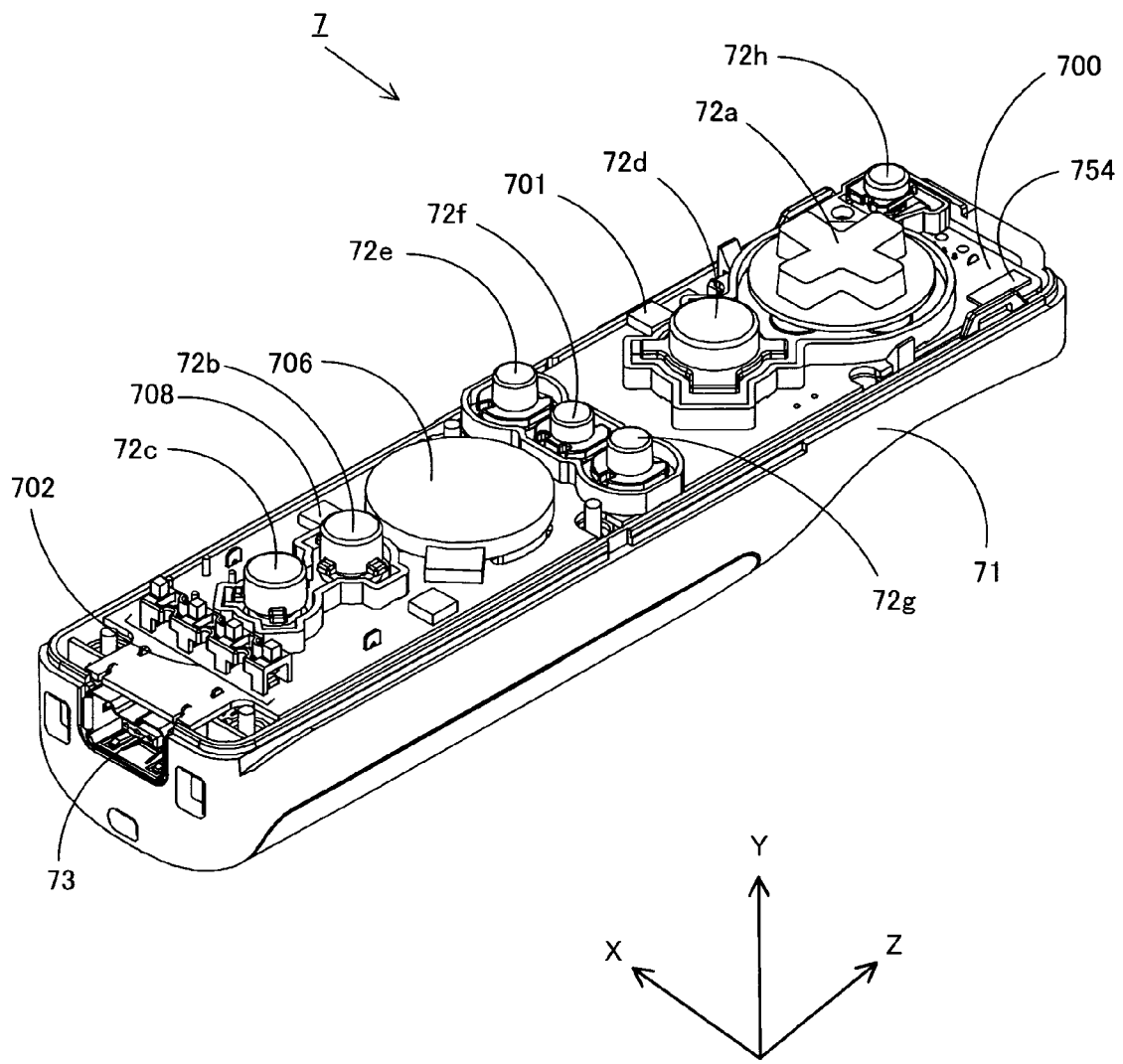

F I G. 6
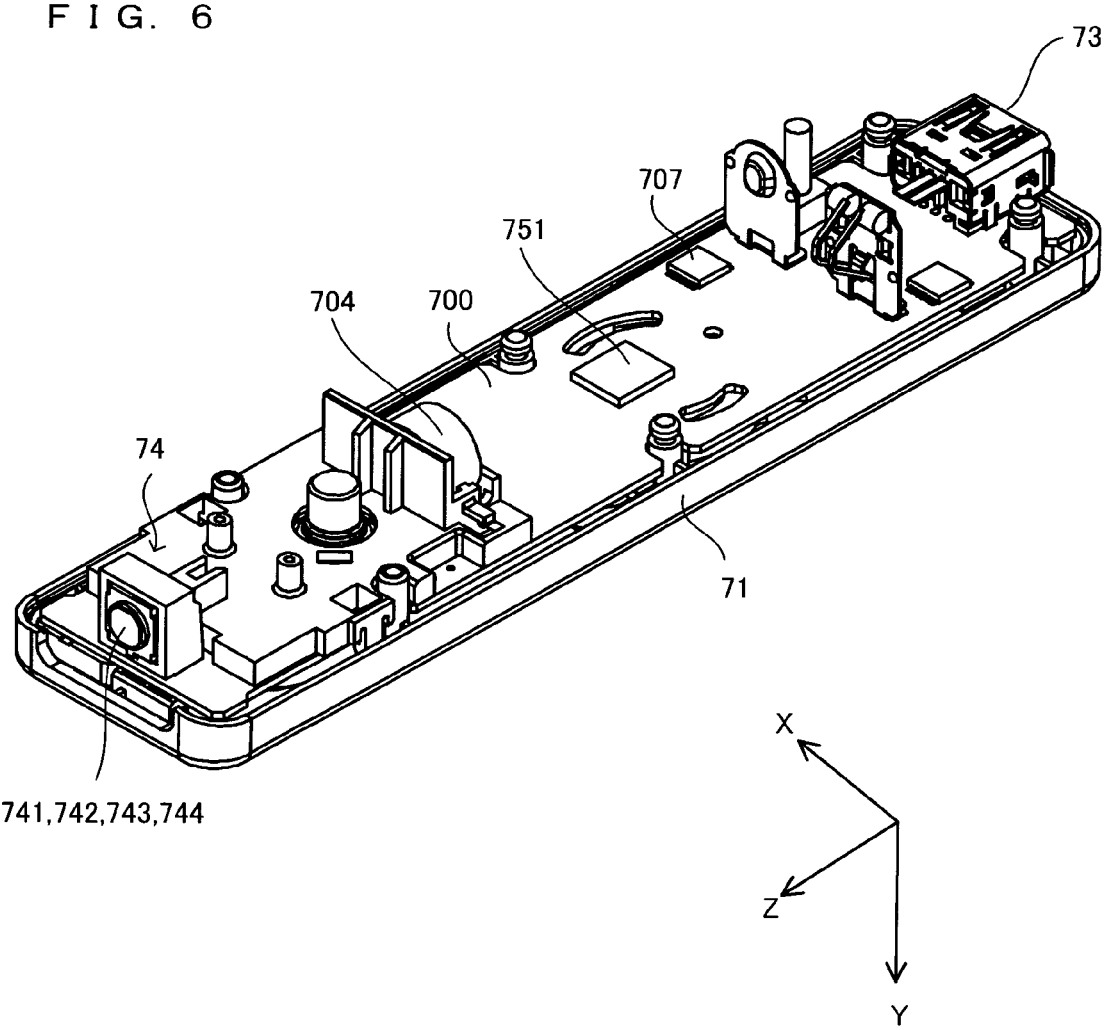

PITCHING (GRAVITY DIRECITON ACCELERATION)

ROLLING (HORIZONTAL DIRECITON ACCELERATION)

F I G. 10
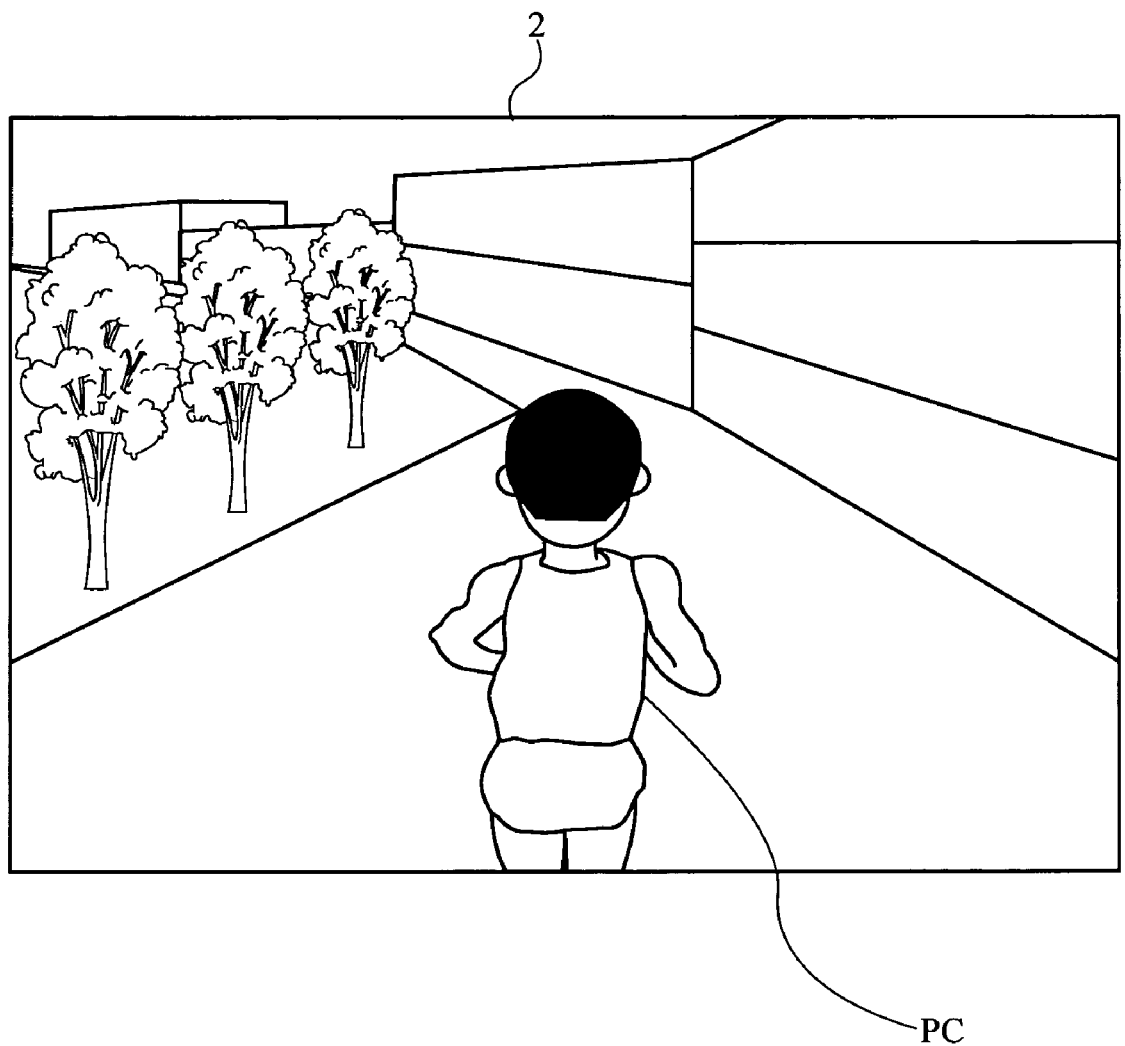

STORAGE MEDIUM HAVING STEP COUNT CALCULATION PROGRAM STORED THEREIN, STEP COUNT CALCULATION APPARATUS, AND STEP COUNT CALCULATION SYSTEM

CROSS REFERENCE TO RELATED APPLICATION

The disclosure of Japanese Patent Application No. 2007-310903, filed on Nov. 30, 2007, is incorporated herein by reference.

BACKGROUND

1. Field

Example embodiments of the present invention relate to a storage medium having a step count calculation program stored therein, a step count calculation apparatus, and a step count calculation system. More particularly, example embodiments of the present invention relate to a storage medium having stored therein a step count calculation program for calculating the number of steps made by a user; a step count calculation apparatus; and a step count calculation system.

2. Description of the Background Art

Conventionally, a pedometer is attached to a body of a user and measures the number of steps in accordance with vibration received from the user. As one example of such a pedometer, Japanese Laid-Open Patent Publication No. 2004-141669 (hereafter, referred to as patent document 1) discloses a body motion detection apparatus which includes acceleration sensors. The body motion detection apparatus disclosed in the above-mentioned patent document 1 includes a plurality of acceleration sensors whose acceleration directions to be detected vary respectively. And the body motion detection apparatus determines a posture of the apparatus by using signals obtained from the respective acceleration sensors and based on the posture, detects body motions (the number of steps) of a user. For example, in the body motion detection apparatus, a waveform of acceleration is analyzed and when the acceleration is reduced from a lower threshold after the acceleration has exceeded an upper threshold, it is determined that the user has made one step.

However, it may occur that the body motion detection apparatus disclosed in the above-mentioned patent document 1 cannot accurately measure the number of steps depending on a manner in which the user carries the body motion detection apparatus. Specifically, when the user walks with the body motion detection apparatus attached to the user's clothing or with the body motion detection apparatus put into a bag, the body motion detection apparatus can detect the number of steps by detecting an acceleration generated by up and down vibration of a body, which is caused when the user walks. On the other hand, when the user walks with the body motion detection apparatus held in his or her hand, because an acceleration generated by back and forth vibration, which is caused when the user swings his or her arms, the body motion detection apparatus cannot accurately measure the number of steps. In other words, because the number of the user's steps, which corresponds to one cycle of a waveform of the acceleration generated by the body's up and down vibration, is different from the number of the user's steps, which corresponds to one cycle of a waveform of the acceleration generated by the up and down vibration which is caused by swinging his or her arms, the body motion detection apparatus cannot accurately measure the number of steps. Since the user does not always carries the body motion detection apparatus so as to generate the acceleration caused by the body's up and down vibration, it is considered that the number of steps could be erroneously detected. In addition, since when the user tries to accurately detect the number of steps, the user is subject to limitations in a manner of carrying the body motion detection apparatus, usability of the body motion detection apparatus is worsened.

SUMMARY

Therefore, one aspect of example embodiments of the present invention is to provide a storage medium having stored therein a step count calculation program which accurately determines the number of steps made by a user by using data outputted from an acceleration sensor; a step count calculation apparatus; and a step count calculation system.

Example embodiments of the present invention have the following features to achieve the aspect mentioned above. Note that reference numerals, step numbers and the like indicated between parentheses are merely provided to facilitate the understanding of example embodiments of the present invention in relation to the later-described best mode embodiment, rather than limiting the scope of the present invention in any way.

A first aspect of an example embodiment of the present invention is directed to a computer-readable storage medium having stored therein a step count calculation program which is executed by a computer (10) in an apparatus (5) for, by using acceleration data (Da) outputted from an acceleration sensor (701) for detecting accelerations (accX, accY, and accZ) acting on a given housing (71), calculating a number of steps made by a user carrying the housing. The step count calculation program causes the computer to function as: acceleration data obtaining means (CPU 10 which executes processing at step 42 and step 122; hereinafter, only step numbers are shown); gravity direction acceleration calculation means (S81, S141); horizontal direction acceleration calculation means (S100, S160); first step count calculation means (S45, S125); second step count calculation means (S46, S126); and step count selection means (S47, S127, S128). The acceleration data obtaining means repeatedly obtains the acceleration data. The gravity direction acceleration calculation means, by using the acceleration data obtained by the acceleration data obtaining means, calculates a gravity direction acceleration (Vw, Vwa) acting in a gravity direction of the housing. The horizontal direction acceleration calculation means, by using the acceleration data obtained by the acceleration data obtaining means, calculates a horizontal direction acceleration (Hvec, Hwa) acting in a horizontal direction perpendicular to the gravity direction of the housing. The first step count calculation means, by using a first coefficient (M), calculates a first step count (Vsd, Vs) in accordance with a change in the gravity direction acceleration. The second step count calculation means, by using a second coefficient (N) which is different from the first coefficient, calculates a second step count (Hsd, Hv) in accordance with a change in the horizontal direction acceleration. The step count selection means, based on a predetermined condition, selects one of the first step count and the second step count as a user's step count.

In a second aspect of an example embodiment of the present invention based on the first aspect, the step count calculation program further causes the computer to function as gravity direction calculation means (S43, S80). The gravity direction calculation means, by using the acceleration data obtained by the acceleration data obtaining means, calculates the gravity direction (vecg) of the housing. Based on the gravity direction calculated by the gravity direction calculation means, the gravity direction acceleration calculation means calculates, as the gravity direction acceleration, components of the gravity direction of the acceleration indicated by the acceleration data obtained by the acceleration data obtaining means. Based on the gravity direction obtained by the gravity direction calculation means, the horizontal direction acceleration calculation means calculates, as the horizontal direction acceleration, components of the horizontal direction of the acceleration indicated by the acceleration data obtained by the acceleration data obtaining means.

In a third aspect of an example embodiment of the present invention based on the second aspect, the first step count calculation means, in accordance with a period (Vt) in which the gravity direction acceleration increases or decreases, calculates the first step count, and the second step count calculation means, in accordance with a period (Ht) in which the horizontal direction acceleration increases or decreases, calculates the second step count.

In a fourth aspect of an example embodiment of the present invention based on the third aspect, the first coefficient and the second coefficient are values determined on a condition that the period in which the horizontal direction acceleration increases or decreases is double the period in which the gravity direction acceleration increases or decreases (FIG. 15A, FIG. 15B).

In a fifth aspect of an example embodiment of the present invention based on the third aspect, the first step count calculation means calculates as the first step count a step count (Vs) which follows at a predetermined rate the step count per unit time, which is calculated based on the period in which the gravity direction acceleration increases or decreases. The second step count calculation means calculates as the second step count a step count (Hsd) which follows at a predetermined rate the step count per unit time, which is calculated based on the period in which the horizontal direction acceleration increases or decreases.

In a sixth aspect of an example embodiment of the present invention based on the third aspect, the first step count calculation means includes first attenuation means (S94, S156). The first attenuation means attenuates the first step count calculated in previous processing in a case (S93, S155) where the period in which the gravity direction acceleration increases or decreases is longer than a predetermined threshold value (Vtmax). The second step count calculation means includes second attenuation means (S113, S175). The second attenuation means attenuates the second step count calculated in the previous processing in a case (S112, S174) where the period in which the horizontal direction acceleration increases or decreases is longer than a predetermined threshold value (Htmax).

In a seventh aspect of an example embodiment of the present invention based on the third aspect, the first step count calculation means includes first local maximum detection means (S86, S146). The first local maximum detection means detects local maximums obtained when the gravity direction acceleration increases or decreases. The second step count calculation means includes second local maximum detection means (S105, S165). The second local maximum detection means detects local maximums obtained when the horizontal direction acceleration increases or decreases. The first step count calculation means calculates the first step count in accordance with a time interval between the local maximums detected by the first local maximum detection means. The second step count calculation means calculates the second step count in accordance with a time interval between the local maximums detected by the second local maximum detection means.

In an eighth aspect of an example embodiment of the present invention based on the seventh aspect, the first step count calculation means calculates the first step count by dividing the first coefficient by the time interval between the local maximums detected by the first local maximum detection means. The second step count calculation means calculates the second step count by dividing the second coefficient by the time interval between the local maximums detected by the second local maximum detection means. The second coefficient is double the first coefficient.

In a ninth aspect of an example embodiment of the present invention based on the seventh aspect, the first local maximum detection means detects the local maximums (Vwa) obtained when an absolute value of the gravity direction acceleration increases or decreases. The second local maximum detection means detects the local maximums (Hwa) obtained when a magnitude of the horizontal direction acceleration increases or decreases.

In a tenth aspect of an example embodiment of the present invention based on the seventh aspect, the first local maximum detection means detects only local maximums, among the local maximums obtained when the gravity direction acceleration increases or decreases, which are greater than or equal to a predetermined reference value (A) (S85, S145). The second local maximum detection means detects only local maximums, among the local maximums obtained when the horizontal direction acceleration increases or decreases, which are greater than or equal to a predetermined reference value (B) (S104, S164).

In an eleventh aspect of an example embodiment of the present invention based on the third aspect, the first step count calculation means includes: first local maximum detection means; and first time interval prediction means (S150, S151). The first local maximum detection means detects local maximums obtained when the gravity direction acceleration increases or decreases. The first time interval prediction means, in accordance with a magnitude of the gravity direction acceleration, predicts a time interval (VT) from a time point when the first local maximum detection means detects an immediately preceding local maximum to a time point when the first local maximum detection means detects a next local maximum. The second step count calculation means includes: second local maximum detection means; and second time interval prediction means (S169, S170). The second local maximum detection means detects local maximums obtained when the horizontal direction acceleration increases or decreases. The second time interval prediction means, in accordance with a magnitude of the horizontal direction acceleration, predicts a time interval (HT) from a time point when the second local maximum detection means detects an immediately preceding local maximum to a time point when the second local maximum detection means detects a next local maximum. The first step count calculation means calculates the first step count in accordance with the time interval predicted by the first time interval prediction means. The second step count calculation means calculates the second step count in accordance with the time interval predicted by the second time interval prediction means.

In a twelfth aspect of an example embodiment of the present invention based on the eleventh aspect, the first time interval prediction means predicts the time interval by using a magnitude (Vh) of the immediately preceding local maximum detected by the first local maximum detection means and a change amount (|d|) of a value of the gravity direction acceleration. The second time interval prediction means predicts the time interval by using a magnitude (Hh) of the immediately preceding local maximum detected by the second local maximum detection means and a change amount (|e|) of a value of the horizontal direction acceleration.

In a thirteenth aspect of an example embodiment of the present invention based on the first aspect, the step count selection means compares the first step count and the second step count and selects to use one of the first step count and the second step count, whichever is larger than another of the first step count and the second step count (S47).

In a fourteenth aspect of an example embodiment of the present invention based on the first aspect, the step count selection means includes: first amplitude detection means (S127); second amplitude detection means (S127); and ratio calculation means (S127). The first amplitude detection means detects a first amplitude at which the gravity direction acceleration increases or decreases. The second amplitude detection means detects a second amplitude at which the horizontal direction acceleration increases or decreases. The ratio calculation means calculates a ratio (r) between the first amplitude and the second amplitude. When the first amplitude is larger than an amplitude which is obtained by multiplying the second amplitude by a predetermined ratio (K), the step count selection means selects to use the first step count, and when the first amplitude is less than or equal to the amplitude which is obtained by multiplying the second amplitude by the predetermined ratio, the step count selection means selects to use the second step count.

In a fifteenth aspect of an example embodiment of the present invention based on the first aspect, the step count selection means includes accumulated step count calculation means (S48, S49, S129, S130). The accumulated step count calculation means calculates an accumulated step count (St) by sequentially accumulating one of the selected first step count and the selected second step count.

In a sixteenth aspect of an example embodiment of the present invention based on the second aspect, the gravity direction calculation means calculates, as the gravity direction of the housing, a direction of a vector (accf) which follows at a predetermined rate a vector (acc) of the acceleration indicated by the acceleration data obtained by the acceleration data obtaining means.

In a seventeenth aspect of an example embodiment of the present invention based on the sixteenth aspect, based on the gravity direction calculated by the gravity direction calculation means, the gravity direction acceleration calculation means calculates, as the gravity direction acceleration, components of the gravity direction obtained after the following vector has been subtracted from the vector of the acceleration indicated by the acceleration data obtained by the acceleration data obtaining means (S44, S124). Based on the gravity direction calculated by the gravity direction calculation means, the horizontal direction acceleration calculation means calculates, as the horizontal direction acceleration, components of the horizontal direction of the acceleration obtained after the following vector has been subtracted from the vector of the acceleration indicated by the acceleration data obtained by the acceleration data obtaining means (S44, S124).

An eighteenth aspect of an example embodiment of the present invention is directed to a step count calculation apparatus for calculating a number of steps made by a user carrying the step count calculation apparatus. The step count calculation apparatus comprises: an acceleration sensor; a display section; acceleration data obtaining means; gravity direction acceleration calculation means; horizontal direction acceleration calculation means; first step count calculation means; second step count calculation means; step count selection means; and display control means. The acceleration sensor detects accelerations acting on an apparatus body and outputs acceleration data. The display section is provided on the apparatus body. The acceleration data obtaining means repeatedly obtains the acceleration data. The gravity direction acceleration calculation means, by using the acceleration data obtained by the acceleration data obtaining means, calculates a gravity direction acceleration acting in a gravity direction of the apparatus body. The horizontal direction acceleration calculation means, by using the acceleration data obtained by the acceleration data obtaining means, calculates a horizontal direction acceleration acting in a horizontal direction perpendicular to the gravity direction of the apparatus body. The first step count calculation means, by using a first coefficient, calculates a first step count in accordance with a change in the gravity direction acceleration. The second step count calculation means, by using a second coefficient which is different from the first coefficient, calculates a second step count in accordance with a change in the horizontal direction acceleration. The step count selection means, based on a predetermined condition, selects one of the first step count and the second step count as a user's step count. The display control means displays, on the display section, information in accordance with the step count selected by the step count selection means.

A nineteenth aspect of an example embodiment of the present invention is directed to a step count calculation system, including a hand-held unit (7) which is capable of being carried by a user and a body unit (5) which is connected to the hand-held unit via one of wired communication and wireless communication, for calculating a step count made by the user carrying the hand-held unit. The step count calculation system comprises: an acceleration sensor; acceleration data obtaining means; gravity direction acceleration calculation means; horizontal direction acceleration calculation means; first step count calculation means; second step count calculation means; step count selection means; and display control means (S50, S131). The acceleration sensor detects accelerations acting on a body of the hand-held unit and outputs acceleration data. The acceleration data obtaining means obtains the acceleration data from the acceleration sensor. The gravity direction acceleration calculation means, by using the acceleration data obtained by the acceleration data obtaining means, calculates a gravity direction acceleration acting in a gravity direction of the hand-held unit. The horizontal direction acceleration calculation means, by using the acceleration data obtained by the acceleration data obtaining means, calculates a horizontal direction acceleration acting in a horizontal direction perpendicular to the gravity direction of the hand-held unit. The first step count calculation means, by using a first coefficient, calculates a first step count in accordance with a change in the gravity direction acceleration. The second step count calculation means, by using a second coefficient which is different from the first coefficient, calculates a second step count in accordance with a change in the horizontal direction acceleration. The step count selection means, based on a predetermined condition, selects one of the first step count and the second step count as a user's step count. The display control means displays, on the display section (2), information in accordance with the step count selected by the step count selection means. Note that the acceleration data obtaining means, the gravity direction acceleration calculation means, the horizontal direction acceleration calculation means, the first step count calculation means, the second step count calculation means, the step count selection means, and the display control means may be provided in either one of the hand-held unit and the body unit. For example, all of them may be provided in the body unit or a part of them may be provided in the hand-held unit.

According to the above-mentioned first aspect, by using the data outputted from the acceleration sensor, the user's step count can be accurately determined. For example, in a case where the housing is attached to a part of the user's body at which an acceleration in accordance with up-and-down movement of the user's body mainly occurs and in a case where the housing is held by a part of the user's body at which an acceleration caused when the user swings his or her arm mainly occurs, the user's step count per unit time can be correctly calculated and the housing can be freely handled without restricting a manner in which the user holds the housing.

According to the above-mentioned second aspect, by separately calculating the gravity direction acceleration components and the horizontal direction acceleration components in order to obtain the step count, the step count can be calculated in accordance with a manner in which the user holds the housing.

According to the above-mentioned third aspect, by using the period in which the acceleration increases or decreases, the step count made by the user carrying the housing can be easily calculated.

According to the above-mentioned fourth aspect, by using the coefficients, which are determined based on the condition that the period in which the acceleration occurring in the horizontal direction increases or decreases is double the period in which the acceleration occurring in the gravity direction increases or decreases, an appropriate step count in accordance with the characteristics of the respective periods can be calculated.

According to the above-mentioned fifth aspect, invalidating a sudden change in the acceleration, a correct step count can be calculated.

According to the above-mentioned sixth aspect, since the step count is gradually attenuated when the user stops walking, for example, in a case where a game in which the player character moves in accordance with the step count is displayed, the movement looks natural.

According to the above-mentioned seventh aspect, by using the time intervals between the local maximums obtained when the accelerations change, the periods of the changes in the accelerations can be easily calculated.

According to the above-mentioned eighth aspect, by setting the coefficients, which are determined based on the condition that the period in which the acceleration occurring in the horizontal direction increases or decreases is double the period in which the acceleration occurring in the gravity direction increases or decreases, the step count can be easily calculated by utilizing the formula in which each of the coefficients is divided by each of the time intervals between the local maximums.

According to the above-mentioned ninth aspect, since the number of the detected local maximums is increased, an accuracy of calculating the step count is improved.

According to the above-mentioned tenth aspect, since a slight change in the acceleration obtained, for example, when the user is not walking can be excluded, an accurate step count can be calculated.

According to the above-mentioned eleventh aspect, in a simple method in which the time interval between the immediately preceding local maximum and the next local maximum is predicted, the periods in which the accelerations change can be calculated.

According to the above-mentioned twelfth aspect, by using the change amount of the acceleration per unit time and the magnitude of the local maximum previously detected, the time interval until when the acceleration reaches the next local maximum can be easily predicted.

According to the above-mentioned thirteenth aspect, by using the comparison of the magnitudes of the first step count and the second step count, the step count calculation methods can be automatically switched.

According to the above-mentioned fourteenth aspect, by using the comparison of the magnitudes of the amplitudes of the acceleration occurring in the gravity direction and the acceleration occurring in the horizontal direction, the step count calculation methods can be automatically switched. In addition, the switching is performed by using the ratio between the amplitudes, whereby enabled is the determination in consideration of the acceleration characteristics arising, for example, in a case where the housing is attached to a part of the user's body at which acceleration in accordance with up-and-down movement of the user's body mainly occurs and in a case where the housing is held by a part of the user's body at which acceleration caused when the user swings his or her arms mainly occurs.

According to the above-mentioned fifteenth aspect, the processing which uses the value obtained by accumulating the user's step counts is enabled.

According to the above-mentioned sixteenth aspect, the gravity direction of the housing can be easily calculated.

According to the above-mentioned seventeenth aspect, since the gravitational acceleration occurring on the housing can be removed, further accurate calculation of the step count is enabled.

In the step count calculation apparatus and the step count calculation system, the same effects as those of the above-described storage medium having the step count calculation program stored therein can be attained.

These and other features, aspects and advantages of the example embodiments of present invention will become more apparent from the following detailed description of the present invention when taken in conjunction with the accompanying drawings.

BRIEF DESCRIPTION OF THE DRAWINGS

FIG. 3 is a perspective view of the controller 7 in FIG. 1, seen from a top rear side thereof;

FIG. 5 is a perspective view illustrating a state where an upper casing of the controller 7 in FIG. 3 is removed;

FIG. 6 is a perspective view illustrating a state where a lower casing of the controller 7 in FIG. 4 is removed;

FIG. 10 is a diagram illustrating one example of a game image displayed on a monitor 2 in accordance with stepping motions made by a player;

DESCRIPTION OF THE NON-LIMITING EXAMPLE EMBODIMENTS

Figure 1:
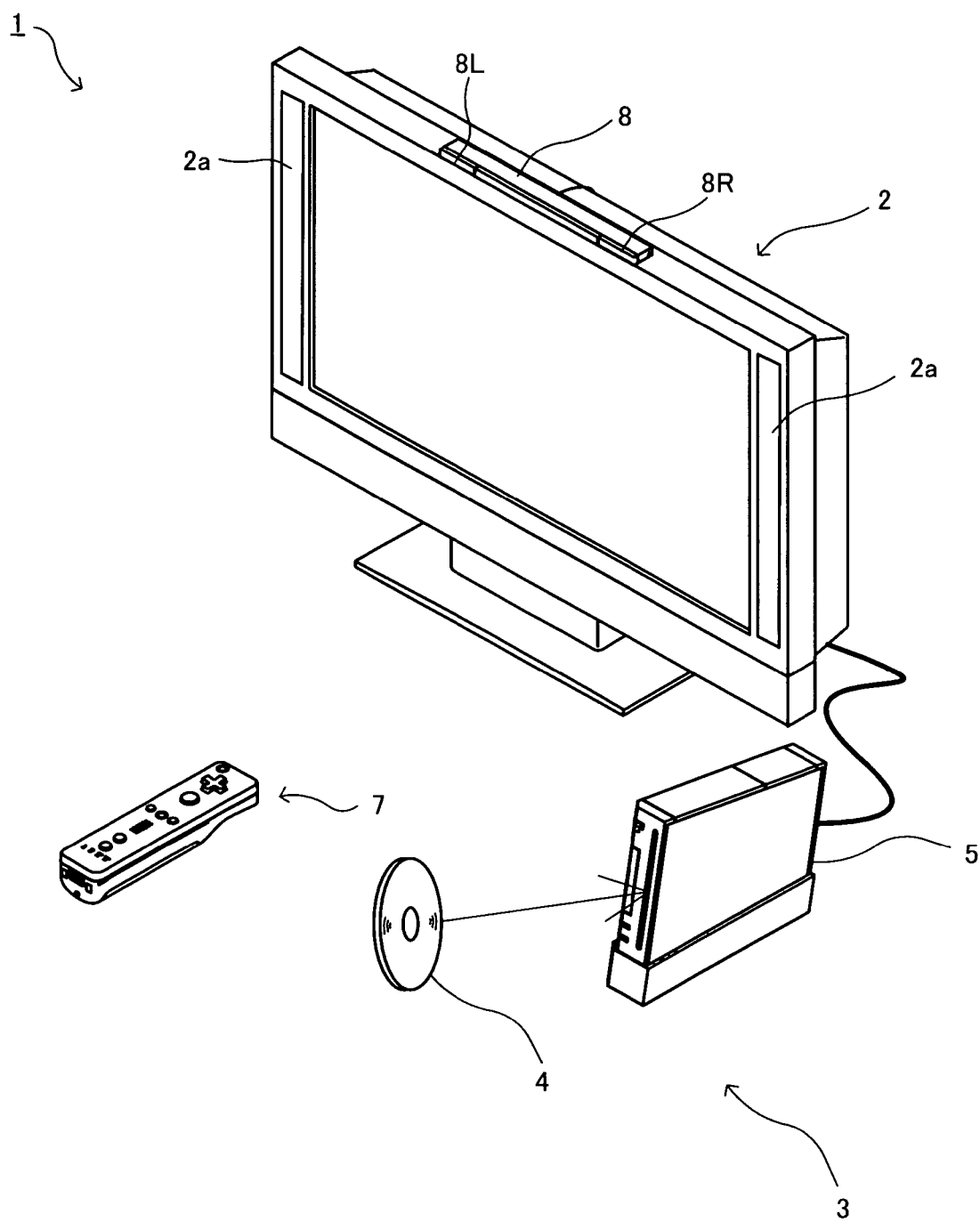
FIG. 1 is an external view illustrating a game system 1 according to an example embodiment of the present invention.
Figure 2:
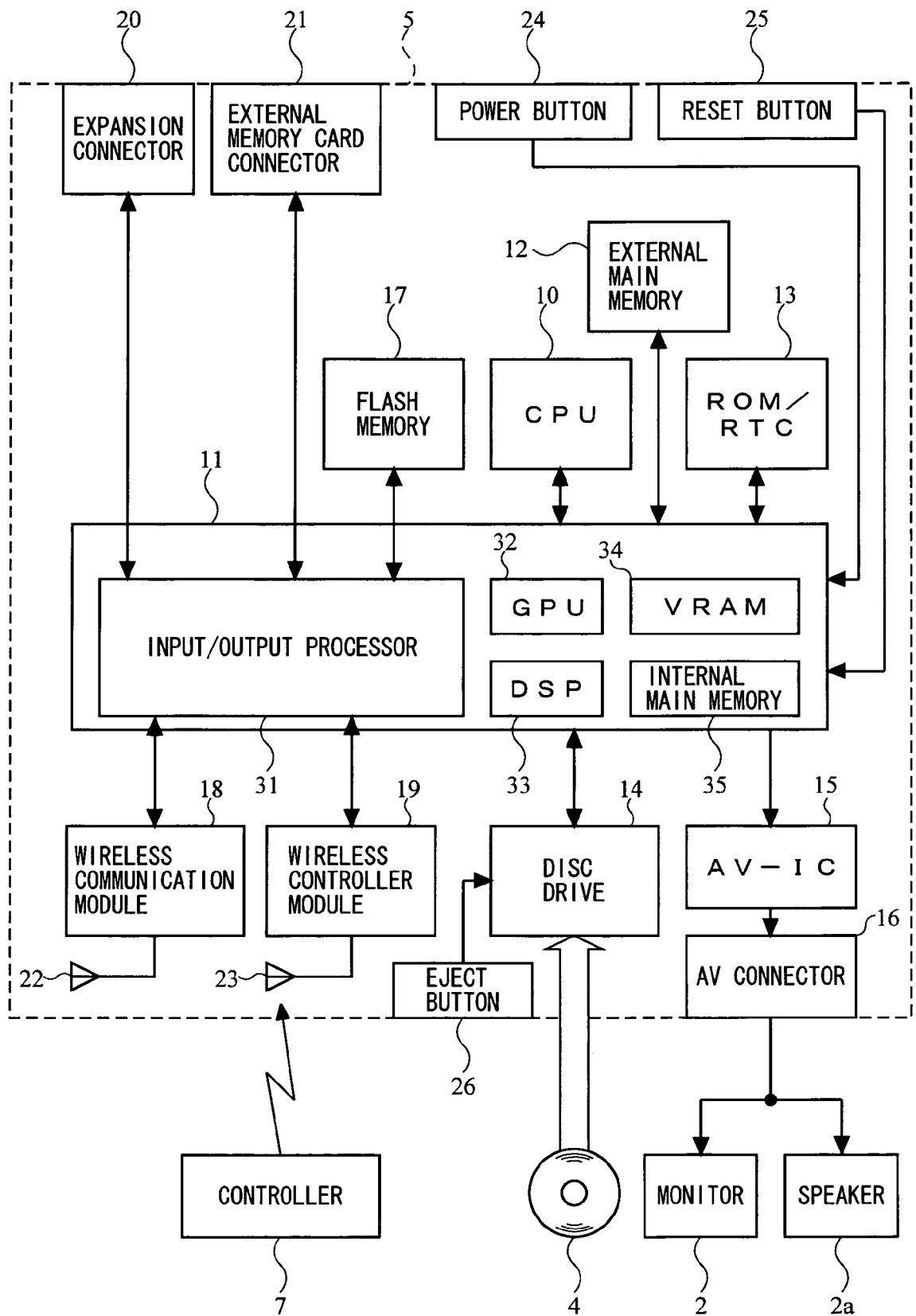
FIG. 2 is a functional block diagram of a game apparatus body 5 in FIG. 1.

With reference to FIG. 1, a step count calculation apparatus for executing a step count calculation program according to an example embodiment of the present invention will be described. Hereinafter, in order to give a specific description, a game system including a stationary game apparatus body 5 which is an example of the above apparatus will be described. FIG. 1 is an external view illustrating a game system 1 including a stationary game apparatus 3. FIG. 2 is a block diagram of the game apparatus body 5. The game system 1 will be described below.

As shown in FIG. 1, the game system 1 comprises: a home-use TV receiver 2 (hereinafter, referred to as a monitor 2) which is an example of display means; and the stationary game apparatus 3 connected to the monitor 2 via a connection cord. The monitor 2 has speakers 2a for outputting, in the form of sound, an audio signal outputted from the game apparatus 3. The game apparatus 3 includes: an optical disc 4 having a game program, which is an exemplary step count calculation program of an example embodiment of the present invention, stored therein; the game apparatus body 5 having a computer for executing the game program of the optical disc 4, thereby causing the monitor 2 to output a game display; and a controller 7 for providing the game apparatus body 5 with necessary operation information for a game in which a character or the like displayed in the game display is controlled.

The game apparatus body 5 has a wireless controller module 19 therein (see FIG. 2). The wireless controller module 19 receives data wirelessly transmitted from the controller 7, and transmits data from the game apparatus body 5 to the controller 7. In this manner, the controller 7 and game apparatus body 5 are connected by radio communication. Further, the optical disc 4 as an example of an exchangeable information storage medium is detachably mounted on the game apparatus body 5.

On the game apparatus body 5, a flash memory 17 (see FIG. 2) is mounted, the flash memory 17 functioning as a backup memory for fixedly storing data such as saved data. The game apparatus body 5 executes the game program or the like stored on the optical disc 4, and displays a result thereof as a game image on the monitor 2. The game program or the like to be executed may be stored not only on the optical disc 4, but also prestored in the flash memory 17. The game apparatus body 5 can reproduce a state of the game played in the past, by using the saved data stored in the flash memory 17, and display a game image of the reproduced state on the monitor 2. A player playing with the game apparatus 3 can enjoy the game by operating the controller 7 while watching the game image displayed on the monitor 2.

By using the technology of, for example, Bluetooth (registered trademark), the controller 7 wirelessly transmits transmission data such as operation information to the game apparatus body 5 having the wireless controller module 19 therein. The controller 7 is operation means for mainly controlling an object or the like displayed on a display screen of the monitor 2. The controller 7 has a housing, which is small enough to be held by one hand, and a plurality of operation buttons (including a cross key, a stick or the like) exposed at a surface of the housing. As described later in detail, the controller 7 includes an imaging information calculation section 74 for taking an image of a view seen from the controller 7. As exemplary imaging targets of the imaging information calculation section 74, two LED modules 8L and 8R (hereinafter, referred to as "markers 8L and 8R") are provided in the vicinity of the display screen of the monitor 2. The markers 8L and 8R each output, e.g., an infrared light forward from the monitor 2. The controller 7 is capable of receiving, at a communication section 75, transmission data wirelessly transmitted from the wireless controller module 19 of the game apparatus body 5, and generating a sound or vibration based on the transmission data.

Next, an internal configuration of the game apparatus body 5 will be described with reference to FIG. 2. FIG. 2 is a block diagram showing the configuration of the game apparatus body 5. The game apparatus body 5 has a CPU (Central Processing Unit) 10, system LSI (Large Scale Integration) 11, external main memory 12, ROM/RTC (Read Only Memory/Real Time Clock) 13, disc drive 14, AV-IC (Audio Video-Integrated Circuit) 15, and the like.

The CPU 10 performs game processing by executing the game program stored in the optical disc 4, and acts as a game processor. The CPU 10 is connected to the system LSI 11. In addition to the CPU 10, the external main memory 12, ROM/RTC 13, disc drive 14 and the AV-IC 15 are connected to the system LSI 11. The system LSI 11 performs processing such as: controlling data transfer among components connected to the system LSI 11; generating an image to be displayed; and obtaining data from external devices. An internal configuration of the system LSI 11 will be described later. The external main memory 12, which is a volatile memory, stores such a program as the game program loaded from the optical disc 4, or the game program loaded from the flash memory 17, and various data. The external main memory 12 is used as a work region or buffer region of the CPU 10. The ROM/RTC 13 has a ROM, in which a boot program for the game apparatus body 5 is incorporated (so-called boot ROM), and a clock circuit (RTC) which counts the time. The disc drive 14 reads program data, texture data and the like from the optical disc 4, and writes the read data into a later-described internal main memory 35 or into the external main memory 12.

On the system LSI 11, an input/output processor 31, a GPU (Graphic Processor Unit) 32, a DSP (Digital Signal Processor) 33, a VRAM (Video RAM) 34 and the internal main memory 35 are provided. Although not shown, these components 31 to 35 are connected to each other via an internal bus.

The GPU 32 partly forms rendering means, and generates an image in accordance with a graphics command from the CPU 10. The VRAM 34 stores necessary data for the GPU 32 to execute the graphics command (data such as polygon data and texture data). At the time of generating the image, the GPU 32 uses the data stored in the VRAM 34, thereby generating image data.

The DSP 33 acts as an audio processor, and generates audio data by using sound data and sound waveform (tone) data stored in the internal main memory 35 and external main memory 12.

The image data and audio data generated in the above manner are read by the AV-IC 15. The AV-IC 15 outputs the read image data to the monitor 2 via the AV connector 16, and outputs the read audio data to the speakers 2a embedded in the monitor 2. As a result, the image is displayed on the monitor 2 and the sound is outputted from the speakers 2a.

The input/output processor (I/O Processor) 31 performs data transmission/reception with components connected thereto, and downloads data from external devices, for example. The input/output processor 31 is connected to the flash memory 17, a wireless communication module 18, the wireless controller module 19, an expansion connector 20 and an external memory card connector 21. An antenna 22 is connected to the wireless communication module 18, and the antenna 23 is connected to the wireless controller module 19.

The input/output processor 31 is connected to a network via the wireless communication module 18 and antenna 22, thereby communicating with other game apparatuses and various servers connected to the network. The input/output processor 31 regularly accesses the flash memory 17 to detect presence or absence of data which is required to be transmitted to the network. If such data is present, the data is transmitted to the network via the wireless communication module 18 and antenna 22. Also, the input/output processor 31 receives, via the network, antenna 22 and wireless communication module 18, data transmitted from other game apparatuses or data downloaded from a download server, and stores the received data in the flash memory 17. By executing the game program, the CPU 10 reads the data stored in the flash memory 17 to use the data for the game program. In addition to the data transmitted and received between the game apparatus body 5 and other game apparatuses or various servers, the flash memory 17 may store saved data of the game which is played using the game apparatus body 5 (such as result data or progress data of the game).

Further, the input/output processor 31 receives, via the antenna 23 and wireless controller module 19, operation data or the like transmitted from the controller 7, and stores (temporarily) the operation data or the like in a buffer region of the internal main memory 35 or external main memory 12. Note that, similarly to the external main memory 12, the internal main memory 35 may store such a program as the game program loaded from the optical disc 4, or the game program loaded from the flash memory 17, and various data. The internal main memory 35 may be used as a work region or buffer region of the CPU 10.

In addition, the expansion connector 20 and the external memory card connector 21 are connected to the input/output processor 31. The expansion connector 20 is a connector for such interface as USB or SCSI. The expansion connector 20, instead of the wireless communication module 18, is able to perform communications with a network by being connected to such a medium as external storage medium, a peripheral device, e.g., another controller, or a connector for wired communication. The external memory card connector 21 is a connector to be connected to an external storage medium such as a memory card. For example, the input/output processor 31 is able to access the external storage medium via the expansion connector 20 or external memory card connector 21 to store or read data from the external storage medium.

On the game apparatus body 5 (e.g., on a front main surface), a power button 24 of the game apparatus body 5, a reset button 25 for game processing, an insertion slot for mounting the optical disc 4 in a detachable manner, an eject button 26 for ejecting the optical disc 4 from the insertion slot of the game apparatus body 5, and the like are provided. The power button 24 and reset button 25 are connected to the system LSI 11. When the power button 24 is turned on, each component of the game apparatus body 5 is supplied with power via an AC adaptor which is not shown. When the reset button 25 is pressed, the system LSI 11 reexecutes the boot program of the game apparatus body 5. The eject button 26 is connected to the disc drive 14. When the eject button 26 is pressed, the optical disc 4 is ejected from the disc drive 14.

Figure 4:
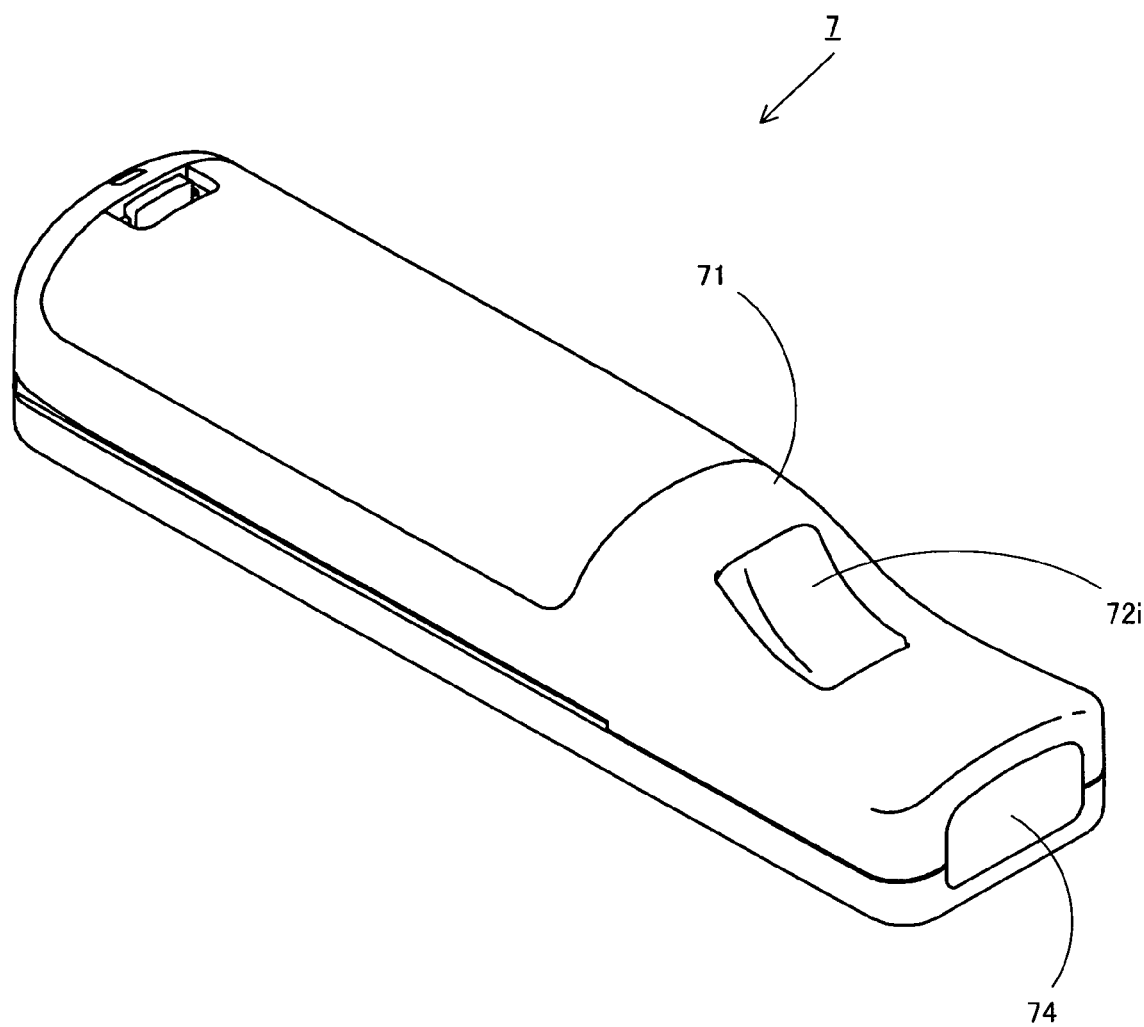
FIG. 4 is a perspective view of the controller 7 in FIG. 3, seen from a bottom front side thereof.

With reference to FIGS. 3 and 4, the controller 7 will be described. FIG. 3 is a perspective view of the controller 7 seen from a top rear side thereof. FIG. 4 is a perspective view of the controller 7 seen from a bottom front side thereof.

As shown in FIGS. 3 and 4, the controller 7 includes a housing 71 formed by plastic molding or the like. The housing 71 has a plurality of operation sections 72 provided thereon. The housing 71 has an approximately parallelepiped shape extending in a longitudinal direction from front to rear. The overall size of the housing 71 is small enough to be held by one hand of an adult or even a child.

At the center of a front part of a top surface of the housing 71, a cross key 72a is provided. The cross key 72a is a cross-shaped four-direction push switch. The cross key 72a includes operation portions corresponding to four directions (front, rear, right and left), which are respectively located on cross-shaped projecting portions arranged at intervals of 90 degrees. A player selects one of the front, rear, right and left directions by pressing one of the operation portions of the cross key 72a. Through an operation of the cross key 72a, the player can, for example, indicate a direction in which a player character or the like appearing in a virtual game world is to move, or give an instruction to select one of a plurality of options.

The cross key 72a is an operation section for outputting an operation signal in accordance with the above-described direction input operation performed by the player. Such an operation section may be provided in another form. For example, an operation section, which has four push switches arranged in crisscross directions and which is capable of outputting an operation signal in accordance with a push switch pressed by the player, may be provided. Alternatively, an operation section, which has a composite switch having, in addition to the above four push switches, a center switch at an intersection point of the above crisscross directions, may be provided. Still alternatively, the cross key 72a may be replaced with an operation section which includes an inclinable stick (so-called joy stick) projecting from a top surface of the housing 71 and which outputs an operation signal in accordance with an inclining direction of the stick. Still alternatively, the cross key 72a may be replaced with an operation section which includes a horizontally-slidable disc-shaped member and which outputs an operation signal in accordance with a sliding direction of the disc-shaped member. Still alternatively, the cross key 72a may be replaced with a touch pad.

Behind the cross key 72a on the top surface of the housing 71, a plurality of operation buttons 72b to 72g are provided. The operation buttons 72b to 72g are each an operation section for, when the player presses a head thereof, outputting a corresponding operation signal. For example, functions as a 1st button, 2nd button and A button are assigned to the operation buttons 72b to 72d. Also, functions as a minus button, home button and plus button are assigned to the operation buttons 72e to 72g, for example. Various operation functions are assigned to the operation buttons 72a to 72g in accordance with the game program executed by the game apparatus body 5. In an exemplary arrangement shown in FIG. 3, the operation buttons 72b to 72d are arranged in a line at the center in a front-rear direction on the top surface of the housing 71. The operation buttons 72e to 72g are arranged on the top surface of the housing 71 in a line in a left-right direction between the operation buttons 72 band 72d. The operation button 72f has a top surface thereof buried in the top surface of the housing 71, so as not to be inadvertently pressed by the player.

In front of the cross key 72a on the top surface of the housing 71, an operation button 72h is provided. The operation button 72h is a power switch for turning on and off the power to the game apparatus body 5 by remote control. The operation button 72h also has a top surface thereof buried in the top surface of the housing 71, so as not to be inadvertently pressed by the player.

Behind the operation button 72c on the top surface of the housing 71, a plurality of LEDs 702 are provided. Here, a controller type (number) is assigned to the controller 7 such that the controller 7 is distinguishable from the other controllers 7. The LEDs 702 are used for, e.g., informing the player of the controller type which is currently set for the controller 7. Specifically, a signal is transmitted from the wireless controller module 19 to the controller 7 such that one of the plurality of LEDs 702, which corresponds to the controller type of the controller 7, is lit up.

On the top surface of the housing 71, sound holes for outputting sounds from a later-described speaker (speaker 706 shown in FIG. 5) to the external space are formed between the operation button 72b and the operation buttons 72e to 72g.

On a bottom surface of the housing 71, a recessed portion is formed. The recessed portion on the bottom surface of the housing 71 is formed in a position in which an index finger or middle finger of the player is located when the player holds the controller 7 so as to point a front surface thereof to the markers 8L and 8R. On a slope surface of the recessed portion, an operation button 72i is provided. The operation button 72i is an operation section acting as, for example, a B button.

On a front surface of the housing 71, an image pickup element 743 forming a part of the imaging information calculation section 74 is provided. The imaging information calculation section 74 is a system for: analyzing image data of an image taken by the controller 7; identifying an area having a high brightness in the image; and detecting a position of a center of gravity, a size and the like of the area. The imaging information calculation section 74 has, for example, a maximum sampling period of approximately 200 frames/sec, and therefore can trace and analyze even relatively fast motion of the controller 7. A configuration of the imaging information calculation section 74 will be described later in detail. On a rear surface of the housing 71, a connector 73 is provided. The connector 73 is, for example, an edge connector, and is used for engaging and connecting the controller 7 with a connection cable.

Here, in order to make the following description specific, coordinate systems which are set for the controller 7 will be defined. As shown in FIGS. 3 and 4, the X, Y, Z axes which are mutually-perpendicular will be defined with respect to the controller 7. Specifically, a longitudinal direction of the housing 71, in which the controller 7 moves back and forth, is defined as the Z axis. A direction which a front surface of the controller 7 (a surface on which the imaging information calculation section 74 is provided) faces is defined as a Z axis forward direction. A direction in which the controller 7 moves up and down is defined as the Y axis. A direction which an upper surface of the housing 71 (a surface on which the operation button 72a is provided) faces is defined as a Y axis forward direction. A right-and-left direction of the controller 7 is defined as the X axis. A direction which a side surface of the housing 71 (a side surface which is not shown in FIG. 3) faces is defined as an X axis forward direction.

Next, an internal structure of the controller 7 will be described with reference to FIGS. 5 and 6. FIG. 5 is a perspective view, seen from a rear surface side of the controller 7, illustrating a state where an upper casing (a part of the housing 71) of the controller 7 is removed. FIG. 6 is a perspective view, seen from a front surface side of the controller 7, illustrating a state where a lower casing (a part of the housing 71) of the controller 7 is removed. Here, FIG. 6 is a perspective view showing a reverse side of a substrate 700 shown in FIG. 5.

As shown in FIG. 5, the substrate 700 is fixed inside the housing 71. On a top main surface of the substrate 700, the operation buttons 72a to 72h, an acceleration sensor 701, the LEDs 702, an antenna 754 and the like are provided. These elements are connected to, e.g., a microcomputer 751 (see FIGS. 6 and 7) by wirings (not shown) formed on the substrate 700 and the like. The wireless module 753 (see FIG. 7) and antenna 754 allow the controller 7 to act as a wireless controller. Inside the housing 71, a quartz oscillator, which is not shown, is provided, and the quarts oscillator generates a reference clock of the later-described microcomputer 751. Further, the speaker 706 and an amplifier 708 are provided on the top main surface of the substrate 700. The acceleration sensor 701 is provided, on the substrate 700, to the left side of the operation button 72d (i.e., provided not on a central portion but on a peripheral portion of the substrate 700). For this reason, in response to the controller 7 having rotated around an axis of a longitudinal direction of the controller 7, the acceleration sensor 701 is able to detect, in addition to a change in direction of gravitational acceleration, an acceleration containing centrifugal components, and the game apparatus body 5 or the like is able to determine, based on detected acceleration data, motion of the controller 7 by a predetermined calculation with a favorable sensitivity.

As shown in FIG. 6, at a front edge of a bottom main surface of the substrate 700, the imaging information calculation section 74 is provided. The imaging information calculation section 74 comprises an infrared filter 741, a lens 742, the image pickup element 743 and an image processing circuit 744 which are located in said order from the front surface of the controller 7. These elements are attached to the bottom main surface of the substrate 700. At a rear edge of the bottom main surface of the substrate 700, the connector 73 is attached. Further, a sound IC 707 and the microcomputer 751 are provided on the bottom main surface of the substrate 700. The sound IC 707 is connected to the microcomputer 751 and amplifier 708 by wirings formed on the substrate 700 and the like, and outputs audio signals via the amplifier 708 to the speaker 706 in response to sound data transmitted from the game apparatus body 5.

On the bottom main surface of the substrate 700, a vibrator 704 is attached. The vibrator 704 may be, for example, a vibration motor or a solenoid. The vibrator 704 is connected to the microcomputer 751 by wirings formed on the substrate 700 and the like, and is activated or deactivated in response to vibration data transmitted from the game apparatus body 5. The controller 7 is vibrated by an actuation of the vibrator 704, and the vibration is conveyed to the player's hand holding the controller 7. Thus, a so-called vibration-feedback game is realized. Since the vibrator 704 is provided at a relatively forward position in the housing 71, the housing 71 held by the player significantly vibrates, and allows the player to clearly feel the vibration.

Figure 7:
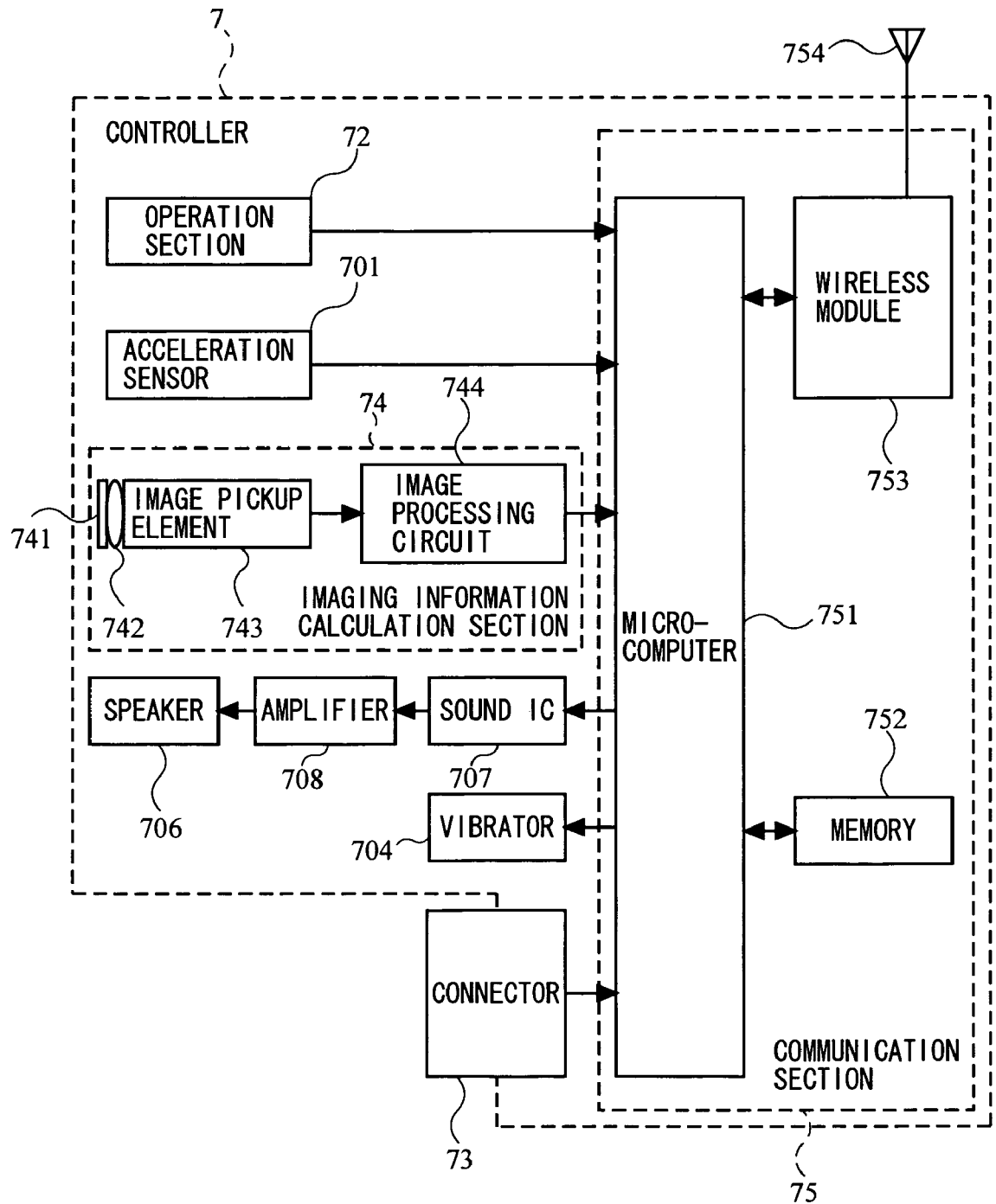
FIG. 7 is a block diagram showing a configuration of the controller 7 in FIG. 3.

Next, an internal configuration of the controller 7 will be described with reference to FIG. 7. FIG. 7 is a block diagram showing the configuration of the controller 7.

As shown in FIG. 7, in addition to the above-described operation sections 72, imaging information calculation section 74, acceleration sensor 701, vibrator 704, speaker 706, sound IC 707 and the amplifier 708, the controller 7 includes the communication section 75.

The imaging information calculation section 74 includes the infrared filter 741, lens 742, image pickup element 743 and the image processing circuit 744. The infrared filter 741 allows, among lights incident thereon through the front surface of the controller 7, only an infrared light to pass therethrough. The lens 742 converges the infrared light which has passed through the infrared filter 741, and outputs the infrared light to the image pickup element 743. The image pickup element 743 is a solid-state image pickup element such as a CMOS sensor or a CCD. The image pickup element 743 takes an image of the infrared light collected by the lens 742. In other words, the image pickup element 743 takes an image of only the infrared light which has passed through the infrared filter 741. Then, the image pickup element 743 generates image data of the image. The image data generated by the image pickup element 743 is processed by the image processing circuit 744. Specifically, the image processing circuit 744 processes the image data obtained from the image pickup element 743, detects an area of the image, which area has a high brightness, and outputs, to the communication section 75, process result data indicating, e.g., position coordinates, square measure and the like detected from the area. The imaging information calculation section 74 is fixed to the housing 71 of the controller 7. An imaging direction of the imaging information calculation section 74 can be changed by changing a facing direction of the housing 71.

It is preferable that the controller 7 includes the acceleration sensor 701 for three axes (X, Y, and Z axes). The acceleration sensor 701 for three axes senses linear accelerations in three directions, i.e., an up-and-down direction (Y axis shown in FIG. 3), a right-and-left direction (X axis shown in FIG. 3), and a back-and-forth direction (Z axis shown in FIG. 3). Acceleration detection means which senses linear accelerations along at least two-axis directions may be used. For example, these acceleration sensors 701 may be ones which are available from Analog Devices, Inc. or ST Microelectronics N.V. It is preferable that the acceleration sensor 701 is a capacitance-type (capacitance-coupling-type) sensor based on technology of silicon microfabricated MEMS (Micro Electro Mechanical Systems). However, by employing technology of the existing acceleration detection means (for example, piezoelectric type means and piezoelectric resistance type means) or other appropriate technology which will be developed in the future, the acceleration sensor 701 may be provided.

Acceleration detection means used as the acceleration sensor 701 is able to sense only accelerations (linear accelerations) along straight lines corresponding to respective axes which the acceleration sensor 701 has. In other words, the acceleration sensor 701 directly outputs signals which indicate the linear accelerations (static or dynamic) respectively along the three axes. Therefore, the acceleration sensor 701 is not able to directly sense physical properties of movement along a non-linear (for example, circular-arcing) path, rotation, rotational motion, angular displacement, inclination, a position, a posture, or the like.

However, it is easy for a person skilled in the art to understand from the descriptions of the present specification that based on the signals of accelerations which are outputted from the acceleration sensor 701, a computer in a processor in the game apparatus (for example, CPU 10), a processor in the controller (for example, microcomputer 751), or the like performs processing, whereby the acceleration sensor 701 is able to guess or calculate (determine) further information regarding the controller 7.

For example, in a case where based on the premise that the controller 7 having the acceleration sensor 701 mounted therein is in a static state, processing is performed on a side of the computer (in other words, in a case where based on the premise that an acceleration detected by the acceleration sensor 701 is only gravitational acceleration, processing is performed), when in reality, the controller 7 is in the static state, it is possible to find out, based on the detected acceleration, whether or not a posture of the controller 7 is inclined toward a gravity direction or to what degree the posture of the controller 7 is inclined. Specifically, only by finding out whether or not 1G (gravitational acceleration) acts in a direction of the detected axis based on a state where an axis detected by the acceleration sensor 701 faces a gravity direction, it is possible to find out whether or not the controller 7 is inclined toward the gravity direction. In addition, by finding out a magnitude of an acceleration which acts in the above-mentioned direction of the detected axis, it is possible to find out to what degree the controller 7 is inclined toward the gravity direction. Also by further processing signals of accelerations detected with respect to respective axes in a case where acceleration sensor 701 is able to detect accelerations in directions of multiple axes, it is possible to find out in more detail to what degree the controller 7 is inclined toward the gravity direction. In this case, based on outputs from the acceleration sensor 701, the processor may perform processing in which data of an angle at which the controller 7 is inclined is calculated. However, without performing the processing of calculating the data of the inclination angle, based on the outputs from the acceleration sensor 701, the processor may perform processing in which an approximate degree to which the controller 7 is inclined is estimated. As described above, by using the acceleration sensor 701 and the processor in combination, it is made possible to determine an inclination, a posture, or a position of the controller 7.

On the other hand, in a case of the premise that the acceleration sensor 701 is in a dynamic state, since the acceleration sensor 701 detects accelerations in accordance with motions of the acceleration sensor 701 in addition to a gravitational acceleration component, when the gravitational acceleration component is removed by performing predetermined processing, it is made possible to find out a motion direction and the like of the controller 7. Specifically, in a case where the controller 7 having the acceleration sensor 701 included therein is dynamically moved by a player's hand in an accelerated manner, by processing acceleration signals generated by the acceleration sensor 701, it is made possible to calculate a variety of motions and/or positions. Note that even in a case of the premise that the acceleration sensor 701 is in the dynamic state, by removing the accelerations in accordance with the motions of the acceleration sensor 701, it is made possible to find out the inclination of the controller 7 toward the gravity direction.

In another embodiment, the acceleration sensor 701 may include a built-in signal processor or other kind of a dedicated processor to perform desired processing for the acceleration signals outputted from built-in acceleration detection means before outputting the signals to the microcomputer 751. For example, in a case where the built-in or dedicated processor may be included in order for the acceleration sensor 701 to detect a static acceleration (for example, a gravitational acceleration), the built-in or dedicated processor may be one which converts the detected acceleration signal to an inclination angle corresponding thereto (or other favorable parameter). Data indicating accelerations respectively detected by the acceleration sensor 701 is outputted to the communication section 75.

The communication section 75 includes the microcomputer 751, a memory 752, the wireless module 753 and the antenna 754. The microcomputer 751 controls the wireless module 753 for wirelessly transmitting transmission data while using the memory 752 as a storage area during processing. The microcomputer 751 also controls operations of the sound IC 707 and vibrator 704 in accordance with data which the wireless module 753 has received from the game apparatus body 5 via the antenna 754. The sound IC 707 processes sound data or the like transmitted from the game apparatus body 5 via the communication section 75. Further, the microcomputer 751 activates the vibrator 704 in accordance with vibration data or the like (e.g., a signal for causing the vibrator 704 to be ON or OFF) which is transmitted from the game apparatus body 5 via the communication section 75.

Data from the controller 7 such as operation signals (key data) from the operation sections 72, acceleration signals (acceleration data with respect to X-, Y-, and Z-axis directions) from the acceleration sensor 701 with respect to the three axial directions, and the process result data from the imaging information calculation section 74 are outputted to the microcomputer 751. The microcomputer 751 temporarily stores inputted data (the key data, the acceleration data with respect to X-, Y-, and Z-axis directions and process result data) in the memory 752 as transmission data to be transmitted to the wireless controller module 19. Here, radio transmission from the communication section 75 to the wireless controller module 19 is performed at predetermined time intervals. Since the game processing is generally performed in at a cycle of 1/60 sec, the radio transmission needs to be performed at a cycle of a shorter time period. Specifically, the game processing is performed at a cycle of 16.7 ms (1/60 sec), and a transmission interval of the communication section 75 structured using the Bluetooth (registered trademark) technology is 5 ms. At a timing of performing a transmission to the wireless controller module 19, the microcomputer 751 outputs, to the wireless module 753, the transmission data stored in the memory 752 as a series of pieces of operation information. The wireless module 753 uses, for example, the Bluetooth (registered trademark) technology to radiate, with a carrier wave having a predetermined frequency, a radio signal from the antenna 754, the radio signal indicating the series of pieces of operation information. Thus, the key data from the operation sections 72, the acceleration data with respect to X-, Y-, and Z-axis directions from the acceleration sensor 701, and the process result data from the imaging information calculation section 74 are transmitted from the controller 7. The wireless controller module 19 of the game apparatus body 5 receives the radio signal, and the game apparatus body 5 demodulates or decodes the radio signal to obtain the series of pieces of operation information (the key data, the acceleration data with respect to X-, Y-, and Z-axis directions and process result data). In accordance with the series of pieces of obtained operation information and the game program, the CPU 10 of the game apparatus body 5 performs game processing. In the case where the communication section 75 is structured using the Bluetooth (registered trademark) technology, the communication section 75 can have a function of receiving transmission data wirelessly transmitted from other devices.

Figure 8:
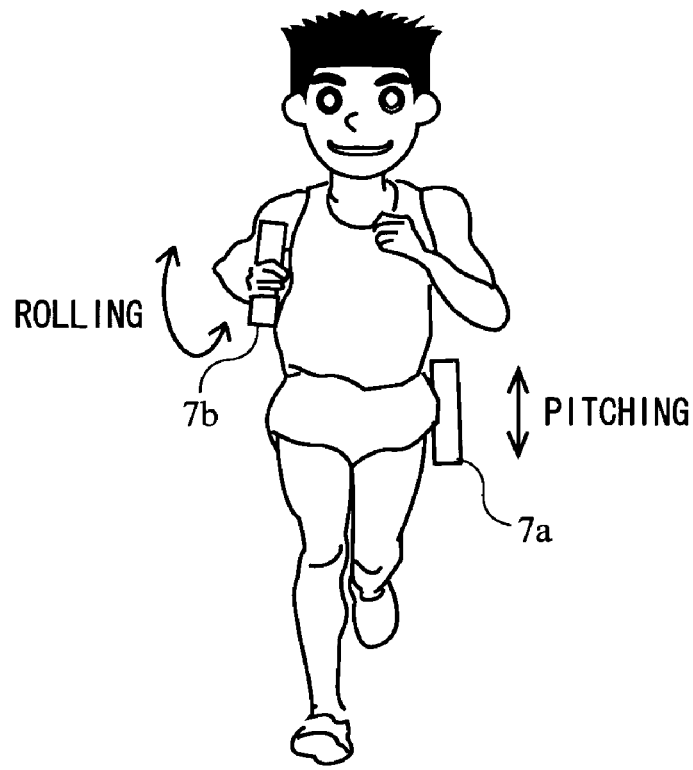
FIG. 8 is a diagram illustrating an exemplary state where a game operation is performed using the controller 7 in FIG. 3.
Figure 8:
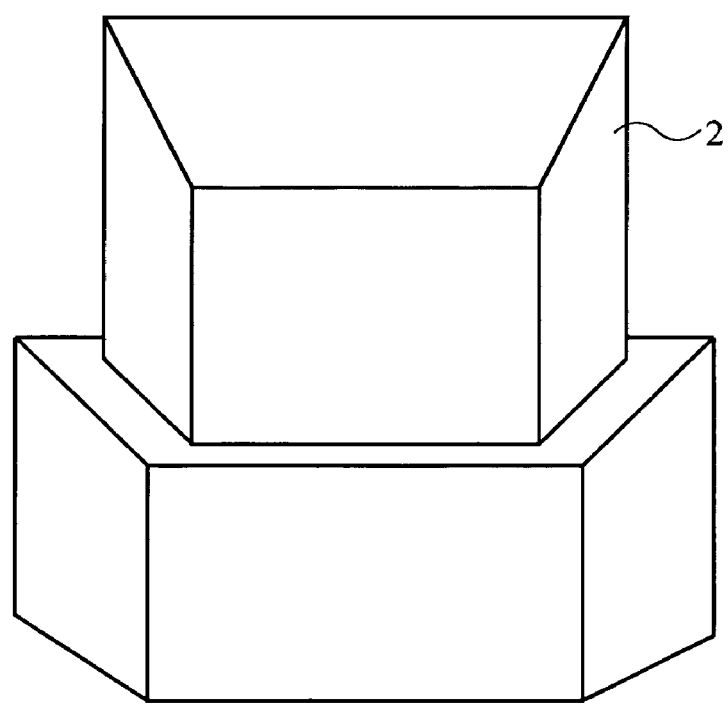

Next, before describing specific processing performed by the game apparatus body 5, an outline of a game played with the present game apparatus body 5 will be described. As shown in FIG. 8, the controller 7 is of a size which allows an adult or a child to hold the whole of the controller 7 in one hand. In order to play the game by using the controller 7 in the game system 1, a player makes steps in a place with the controller 7 attached on his or her body or with the controller 7 held by his or her hand. When the player make steps in a manner similar to walking, jogging, running, or the like, operation inputs in accordance with the number of steps are provided to the game apparatus body 5.

Here, in the game of the present embodiment, the player may make steps with the controller 7 attached to the player's clothing or the like or with the controller 7 put in a pocket, or may make steps with the controller 7 held by the player's hand. When the player handles the controller 7 even in any of the states, the controller 7 is able to accurately count the number of steps made by the player. In FIG. 8, shown is a view in which the player makes steps with the controller 7 attached at a position of the player's waist and in which the controller 7 is shown as a controller 7a. On the controller 7a attached to the player's body, up-and-down swinging (hereinafter, referred to as "pitching") in accordance with steps made by the player is mainly generated. Also shown in FIG. 8 is a view in which the player makes steps with the controller 7 held by the player's hand and in which the controller 7 is shown as a controller 7b. On the controller 7b held by the player's hand, back-and-forth swinging (hereinafter, referred to as "rolling") in accordance with swinging of the player's arm, which occurs when the player makes steps, is mainly generated. The game apparatus body 5 distinguishes between the pitching and the rolling which occur on these controllers 7a and 7b, and the game processing is performed by utilizing periods, amplitudes, and the like thereof.

In an operation in which the player causes the controller 7 to work in a pitching or rolling manner, information (specifically, acceleration data with respect to X-, Y-, and Z-axis directions) pertinent to dynamic operations in accordance with accelerations and centrifugal force which occur when accelerations are performed in the pitching and rolling directions as well as in accordance with accelerations, centrifugal force, and the like which occur when acceleration conducted for deceleration to stop an operation is performed is provided from the controller 7 to the game apparatus body 5. Since the acceleration sensor 701 is able to detect a change in an acceleration, which occurs on the controller 7, by additionally processing the acceleration data with respect to the X-, Y-, and Z-axis directions, which is outputted from the acceleration sensor 701, it is made possible to distinguish the pitching and the rolling of the controller 7 and to calculate periods of the pitching and the rolling.

Figure 9A:
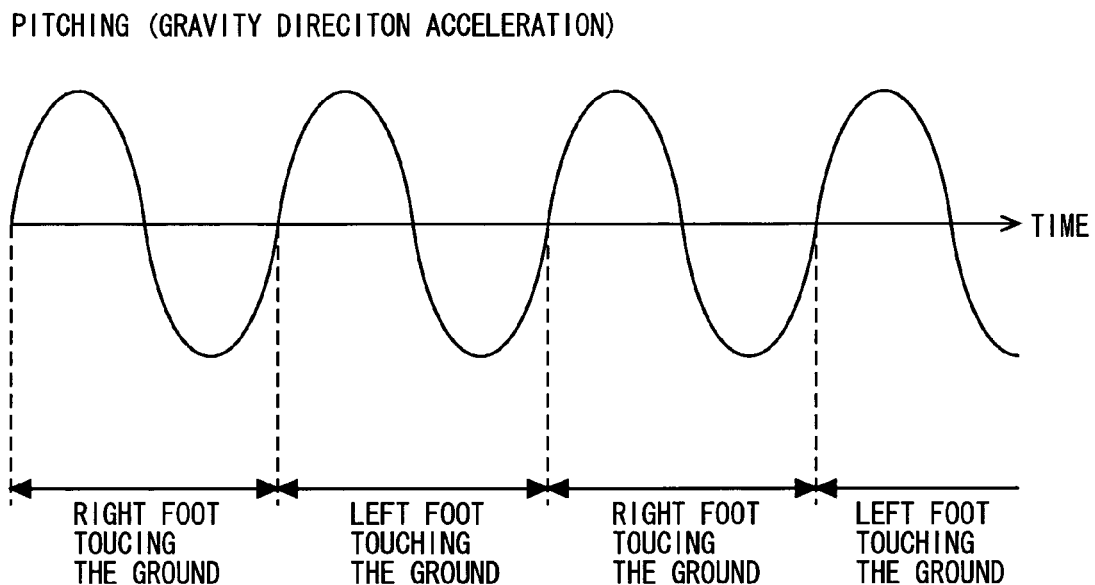
FIG. 9A is a diagram showing one example of a waveform of acceleration in a gravity direction, which acts on the controller 7, in a case where pitching occurs on the controller 7.
Figure 9B:
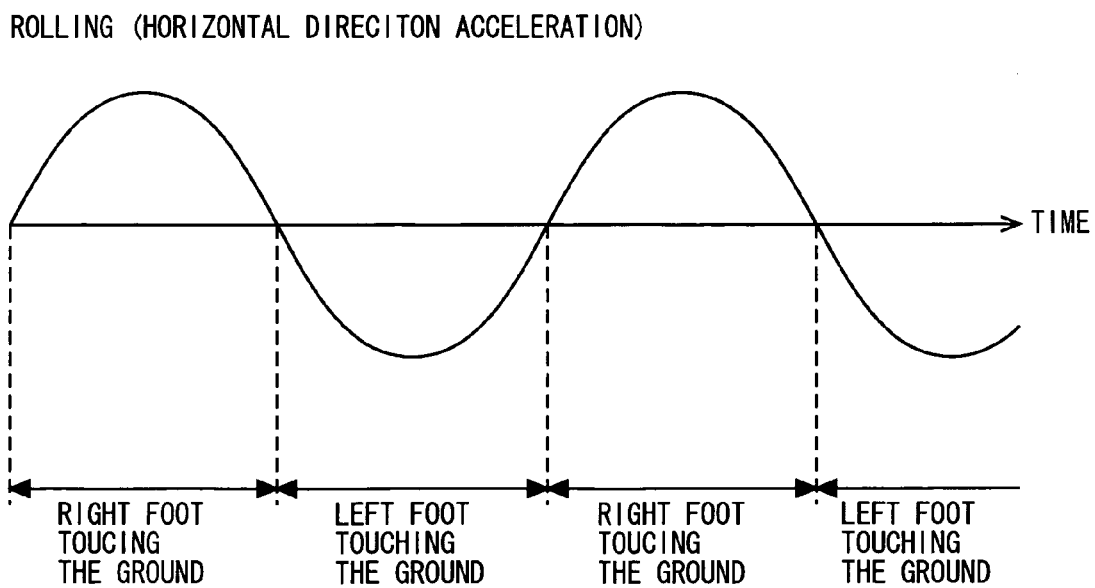
FIG. 9B is a diagram showing one example of a waveform of acceleration in a gravity direction, which acts on the controller 7, in a case where rolling occurs on the controller 7.

For example, as shown in FIG. 9A, in a case where the pitching occurs on the controller 7, with attention paid to an acceleration acting on the controller 7 in the gravity direction, as one example, a waveform of an acceleration, in which one cycle corresponds to one step made by the player, arises. This is because up-and-down vibration is generated on the player's body each time the player's foot touches the floor. On the other hand, as shown in FIG. 9B, in a case where the rolling occurs on the controller 7, with attention paid to an acceleration acting on the controller 7 in a planar direction (i.e., a horizontal direction; hereinafter, referred to as a "horizontal direction,") which is perpendicular to the gravity direction, as one example, a waveform of an acceleration, in which one cycle corresponds to two steps made by the player, arises. In other words, in a case where the number of steps made by the player while the pitching is occurring is the same as the number of steps made by the player while the rolling is occurring, the period in the waveform of the acceleration in the horizontal direction in the rolling is double the period of the waveform of the acceleration in the gravity direction in the pitching. This is mainly because the back-and-forth vibration occurs when the player swings forth his or her arm with which the controller 7 is held when his or her one foot touched on the floor and the player swings back his or her arm with which the controller 7 is held when his or her another foot touched on the floor. Note that in the following description, it is supposed that as a characteristic of the acceleration sensor 701, the acceleration sensor 701 outputs acceleration data indicating an acceleration in a direction which is truly opposite to a direction (i.e., a direction of actual acceleration and a direction of actual deceleration) in which the acceleration is made on the acceleration sensor 701. In other words, it is supposed that acceleration data in accordance with inertial force which is caused by acceleration of the acceleration sensor 701 is outputted. In addition, with respect to the gravitational acceleration which is made on the acceleration sensor 701 in the controller 7, acceleration data in the same direction as that of gravitational force is outputted.

FIG. 10 is a diagram illustrating one example of a game image which is displayed on the monitor 2 in accordance with the above-mentioned step-making operation. As one example of the game processing, processing in which a player character PC displayed on the monitor 2 moves in a virtual game space in accordance with the number of steps counted in the above-mentioned step-making operation will be described.

For example, in FIG. 10, the player character PC who walks, jogs, or runs in the virtual game space is displayed. And the player makes steps so as to walk, jog, or run with the controller 7 attached to the player or with the controller 7 held by the player. In this case, the player character PC moves in the virtual game space at a speed in accordance with the number of steps made by the player.

Next, the game processing performed in the game system 1 will be described in detail. First, with reference to FIG. 11, main data used in the game processing will be described. Note that FIG. 11 is a diagram showing the main data stored in the external main memory 12 and/or the internal main memory 35 (hereinafter, the two main memories are collectively referred to simply as a "main memory") in the game apparatus body 5.

Figure 11:
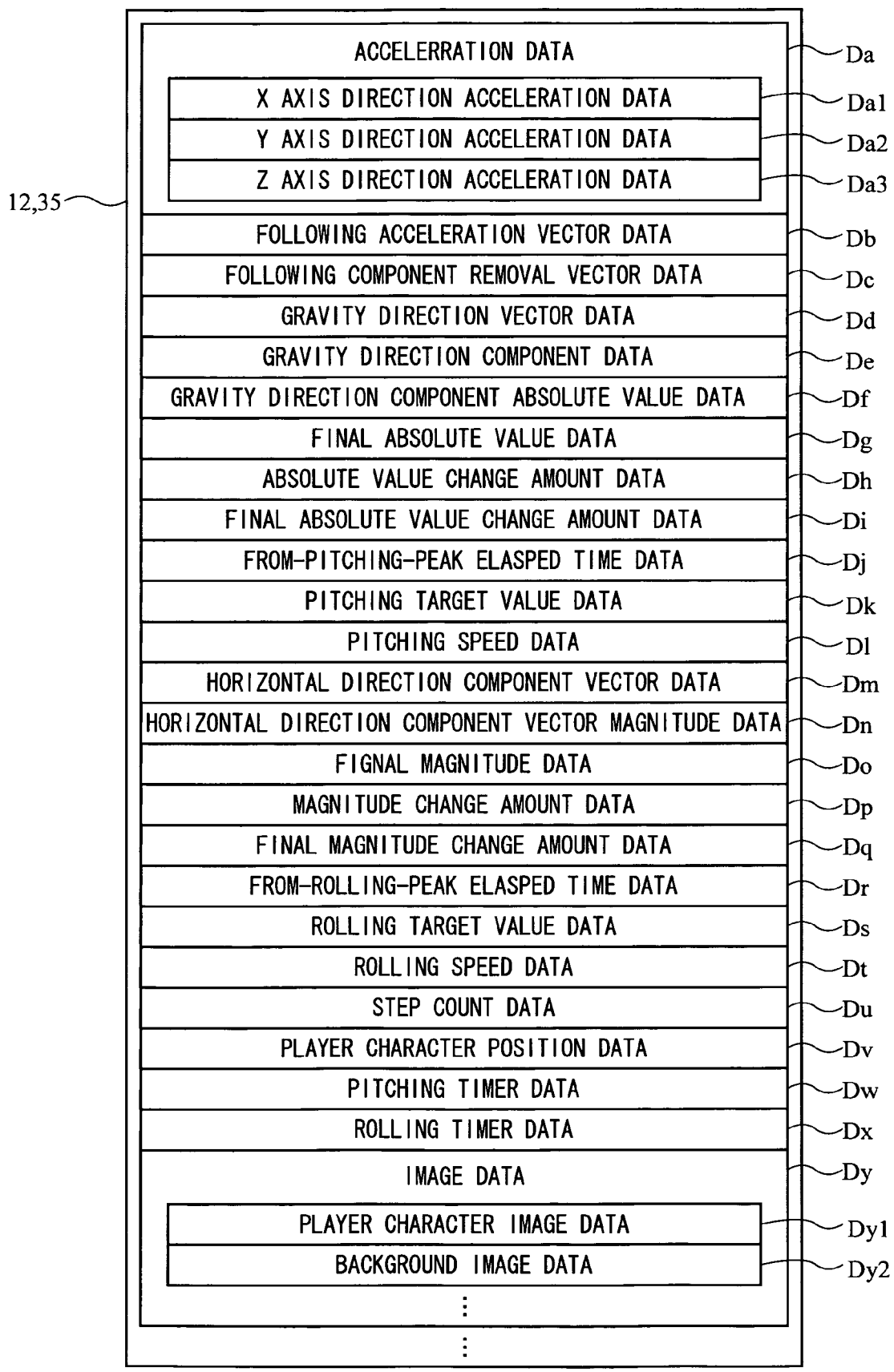
FIG. 11 is a diagram showing main data stored in a main memory in the game apparatus body 5.

As shown in FIG. 11, stored in the main memory are acceleration data Da, following acceleration vector data Db, following component removal vector data Dc, gravity direction vector data Dd, gravity direction component data De, gravity direction component absolute value data Df, final absolute value data Dg, absolute value change amount data Dh, final absolute value change amount data Di, from-pitching-peak elapsed time data Dj, pitching target value data Dk, pitching speed data Dl, horizontal direction component vector data Dm, horizontal direction component vector magnitude data Dn, final magnitude data Do, magnitude change amount data Dp, final magnitude change amount data Dq, from-rolling-peak elapsed time data Dr, rolling target value data Ds, rolling speed data Dt, step count data Du, player character position data Dv, pitching timer data Dw, rolling timer data Dx, image data Dy, etc. Note that in addition to the data shown in FIG. 11, data needed for the game processing, such as data pertinent to objects and the like other than the player character PC which appear in the game (position data, etc.) and data pertinent to the virtual game space (background data, etc.), are stored in the main memory.

The acceleration data Da indicates acceleration occurring on the controller 7, and acceleration data contained in a series of operation information, which is transmitted as transmission data from the controller 7, is stored in the acceleration data Da. This acceleration data Da includes X axis direction acceleration data Da1 which indicates acceleration accX detected by the acceleration sensor 701 with respect to an X axis component; axis direction acceleration data Da2 which indicates acceleration accY detected by the acceleration sensor 701 with respect to a Y axis component; and axis direction acceleration data Da3 which indicates acceleration accZ detected by the acceleration sensor 701 with respect to a Z axis component. Note that the wireless controller module 19 included in the game apparatus body 5 receives the acceleration data contained in the operation information which is transmitted at a predetermined cycle (for example, per 1/200 second) from the controller 7, and the acceleration data is stored in a buffer (not shown) included in the wireless controller module 19. Thereafter, the acceleration data stored in the above-mentioned buffer is read out for each one frame (for example, per 1/60 second), which is a game processing cycle, and the acceleration data Da in the main memory is updated.

At this time, since the cycle in which the operation information is received and the processing cycle are different from each other, pieces of the operation information which are received at a plurality of time points are stored in the above-mentioned buffer. In this case, as one example, there is a method in which by repeating processing at several times at the below-mentioned respective steps, all of the pieces of the operation information received at the plurality of time points are processed and thereafter, the processing proceeds to the next step. As another example, there is a method in which at each of the below-mentioned respective steps, only the latest piece of the operation information among the pieces of the operation information received at the plurality of time points is invariably processed and thereafter, the processing proceeds to the next step. In the description given below of the processing, in order to facilitate understanding, the method in which only the latest piece of the operation information among the pieces of the operation information received at the plurality of time points is used is employed.

In addition, in the below-described processing flow, an example in which the acceleration data Da is updated for each one frame which is the game processing cycle will be described. However, the acceleration data Da may be updated in other processing cycle. For example, a method in which the acceleration data Da is updated in each cycle of transmission from the controller 7 and the updated acceleration data is used in each game processing cycle may be employed. In this case, the cycle of updating the acceleration data Da1 to Da3 contained in the acceleration data Da is different from the game processing cycle.

The following acceleration vector data Db contains data indicating a following acceleration vector accf which follows an acceleration vector acc at a predetermined rate. For example, the following acceleration vector data Db contains data indicating an X axis component, a Y axis component, and a Z axis component of the following acceleration vector accf.

The following component removal vector data Dc contains data indicating a following component removal vector vec obtained by subtracting a following acceleration vector accf from the acceleration vector acc. For example, the following component removal vector data Dc contains data indicating an X axis component vecX, a Y axis component vecY, and a Z axis component vecZ of the following component removal vector vec.

The gravity direction vector data Dd contains data indicating a gravity direction vector vecg which shows a direction in which gravity is currently resulting on the controller 7. For example, the gravity direction vector vecg can be obtained by normalizing the following acceleration vector accf. The gravity direction vector data Dd contains indicating an X axis component vecgX, a Y axis component vecgY, and a Z axis component vecgZ of the gravity direction vector vecg.

The gravity direction component data De contains data indicating a gravity direction component Vw of the following component removal vector vec. The gravity direction component absolute value data Df contains data indicating an absolute value Vwa of the gravity direction component Vw. The final absolute value data Dg contains data indicating a final absolute value Vwal having the absolute value Wva, which has been used for the processing, temporarily stored therein in order to be used for the next processing. The absolute value change amount data Dh contains data indicating a change amount of the absolute value Vwa with respect to the final absolute value Vwal (absolute value change amount Vwah). The final absolute value change amount data Di contains data indicating a final absolute value change amount Vwahl having the absolute value change amount Vwah, which has been used for the processing, temporarily stored therein in order to be used for the next processing.

The from-pitching-peak elapsed time data Dj contains data indicating an elapsed time Vt which has passed from a peak (pitching summit) of the absolute value Vwa determined immediately before. The pitching target value data Dk contains data indicating a target value Vsd of a pitching speed Vs which can be obtained from a pitching cycle. The pitching speed data Dl contains data indicating the number of steps (pitching speed Vs) per unit time, which can be obtained from the pitching cycle.

The horizontal direction component vector data Dm contains data indicating a horizontal direction component vector Hvec showing a horizontal direction component of the following component removal vector vec. The horizontal direction component vector magnitude data Dn contains data indicating a magnitude Hwa of the horizontal direction component vector Hvec. The final magnitude data Do contains data indicating a final magnitude Hwal having the magnitude Hwa, which has been used for the processing, temporarily stored therein in order to be used for the next processing. The magnitude change amount data Dp contains data indicating a change amount (magnitude change amount Hwah) of the magnitude Hwa with respect to the final magnitude Hwal. The final magnitude change amount data Dq contains data indicating a final magnitude change amount Hwahl having the magnitude change amount Hwah, which has been used for the processing, temporarily stored therein in order to be used for the next processing.

The from-rolling-peak elapsed time data Dr contains data indicating an elapsed time Ht which has passed from a peak (rolling summit) of the magnitude Hwa determined immediately before. The rolling target value data Ds contains data indicating a target value Hsd of the rolling speed Hs which can be obtained from a rolling cycle. The rolling speed data Dt contains data indicating the number of steps (rolling speed Hs) per unit time, which can be obtained from the rolling cycle.

The step count data Du contains data indicating the player's step count St which is calculated by accumulating the pitching speed Vs and/or the rolling speed Hs. The player character position data Dv contains data indicating of a position of the player character PC in the virtual game space.

The pitching timer data Dw indicates a count value of a pitching timer, which is updated in each processing loop described below, and is to obtain the elapsed time Vt which has passed from the pitching summit. The rolling timer data Dx indicates a count value of a rolling timer, which is updated in each processing loop described below, and is to obtain the elapsed time Ht which has passed from the rolling summit.

The image data Dy contains player character image data Dy1, background image data Dy2, etc. The player character image data Dy1 is to generate a game image by arranging the player character PC in the virtual game space. The background image data Dy2 is to generate a game image by arranging a background in the virtual game space.

Figure 12:
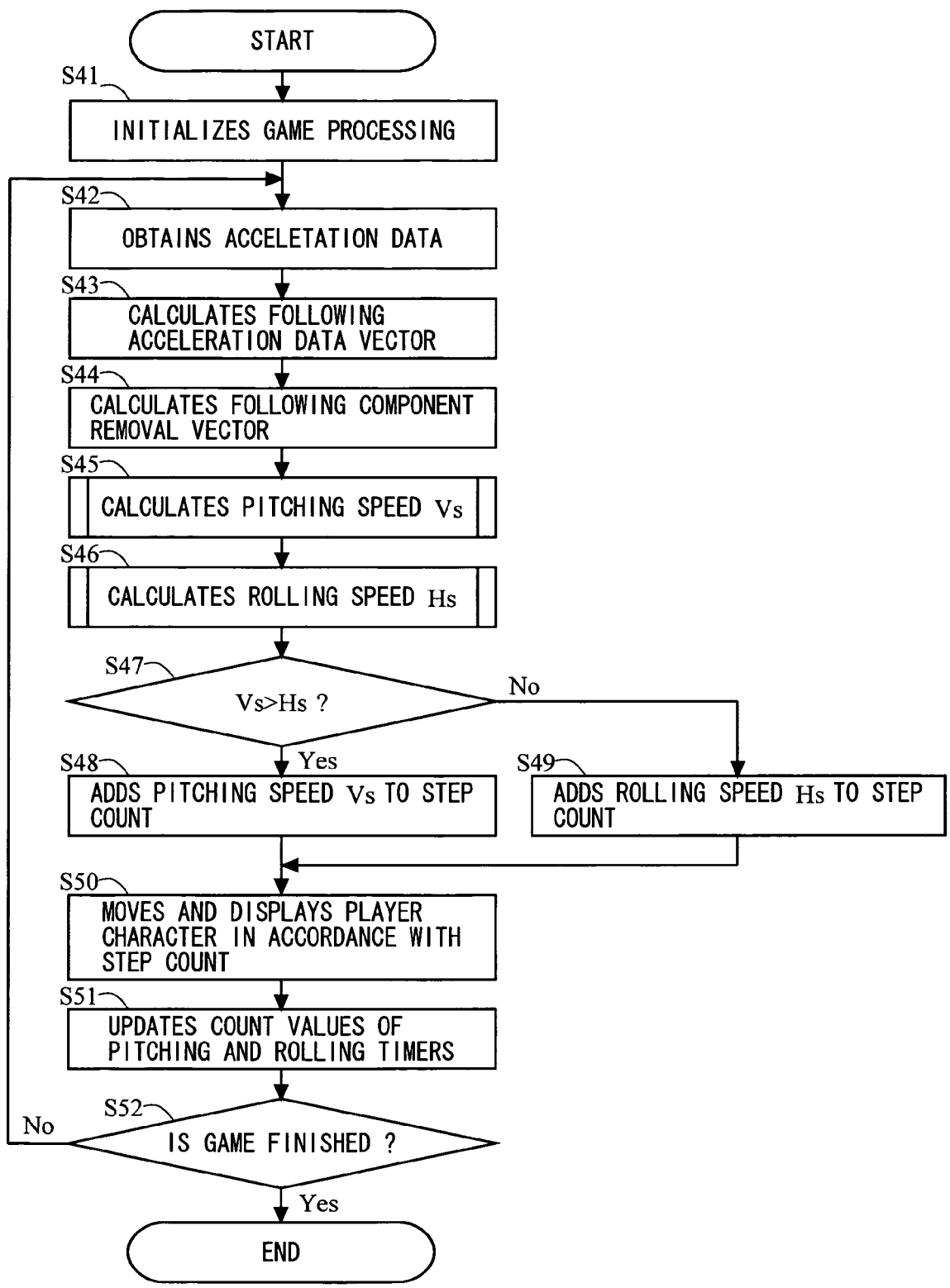
FIG. 12 is a flow chart showing one example of a flow of game processing executed by the game apparatus body 5.
Figure 13:
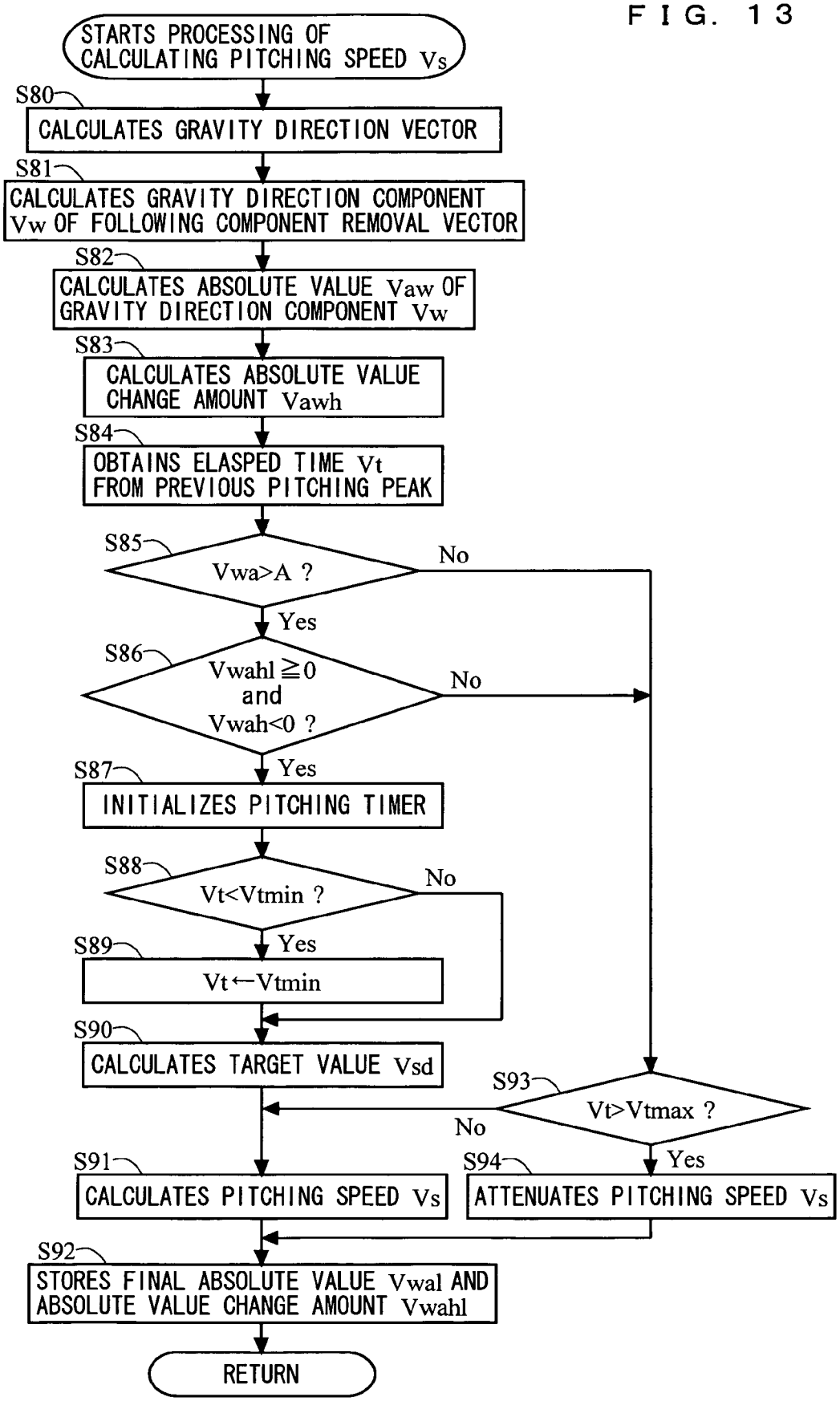
FIG. 13 indicates a subroutine showing detailed operations in one example of processing for calculating a pitching speed Vs at step 45 in FIG. 12.
Figure 14:
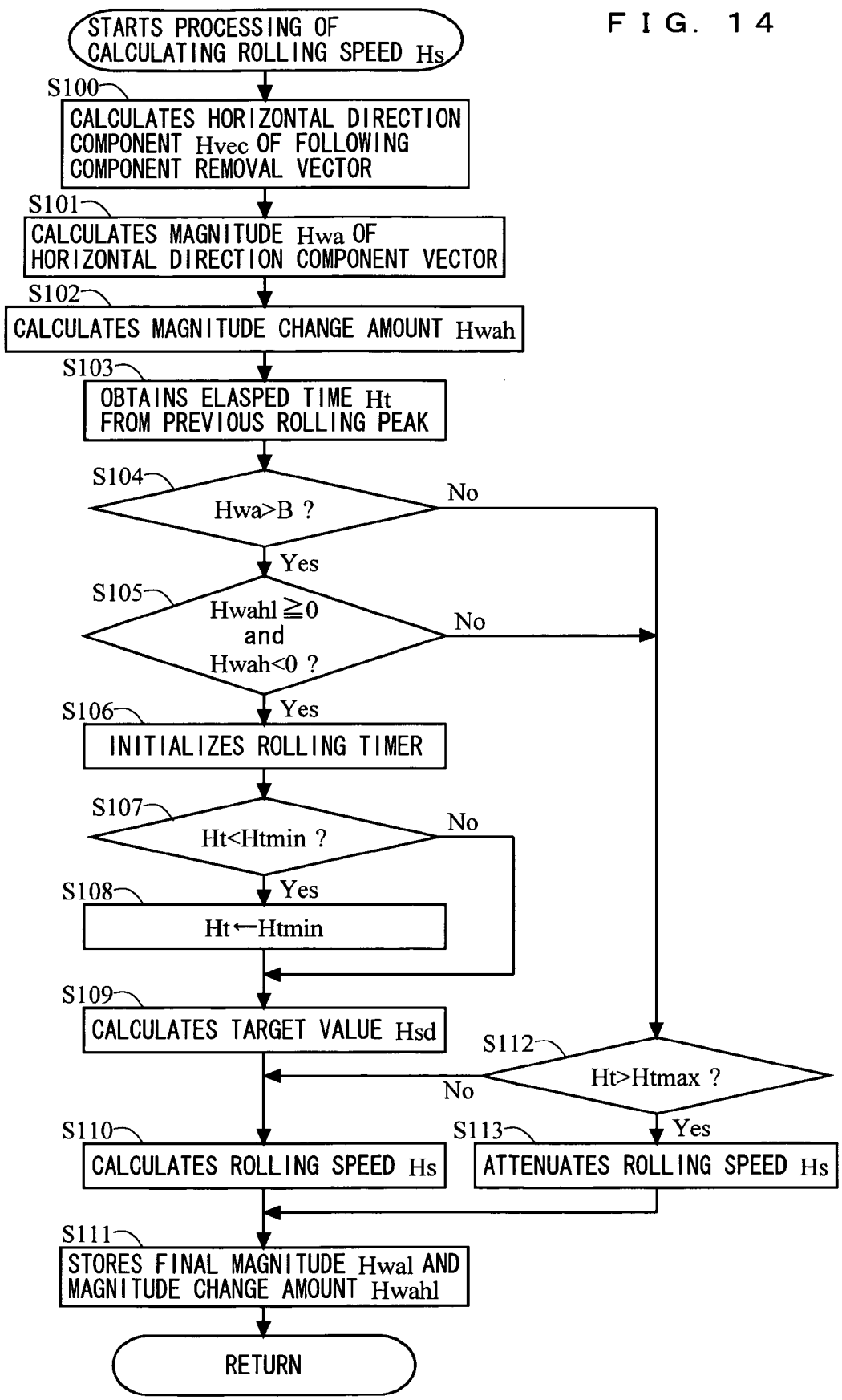
FIG. 14 indicates a subroutine showing detailed operations in one example of processing for calculating a rolling speed Hs at step 46 in FIG. 12.

Next, with reference to FIGS. 12, 13, and 14, the game processing performed in the game apparatus body 5 will be described in detail. FIG. 12 is a flow chart showing one example of a flow of the game processing executed in the game apparatus body 5. FIG. 13 shows a subroutine and details operations performed in one example of processing for calculating the pitching speed Vs at step 45 in FIG. 12. FIG. 14 shows a subroutine and details operations performed in one example of processing for calculating the rolling speed Hs at step 46 in FIG. 12. In the flow charts shown in FIGS. 12, 13, and 14, the processing, among processes performed in the game, for counting the number of steps made by the player with the controller 7 attached to the player or with the controller 7 held by the player's hand will be mainly described. Detailed description on the game processes which do not directly relate to an example embodiment of the present invention will be omitted. In FIGS. 12, 13, and 14, respective steps executed by the CPU 10 will be abbreviated as "S".

As shown in FIG. 12, when power of the game apparatus body 5 is turned on, the CPU 10 in the game apparatus body 5 executes the boot program stored in the ROM/RTC 13, thereby initializing each unit such as the main memory. Then, the game program stored in the optical disc 4 is loaded to the main memory, whereby execution of the game program is started by the CPU 10. The flow charts shown in FIGS. 12, 13, and 14 show the game processing which is performed after the above-mentioned process is completed.

As shown in FIG. 12, the CPU 10 initializes the game processing (step 41) and proceeds to the next step. For example, in the above-mentioned initialization of the game processing at step 41, setting of the virtual game space and initial setting of arrangement and the like of the player character PC are performed. In addition, in the above-mentioned initialization of the game processing at step 41, respective parameters used for calculating the player's number of steps are initialized. For example, the CPU 10 respectively sets the parameters, indicated by the respective pieces of the data stored in the above-mentioned main memory, to be zero.

However, the CPU 10 performs the initialization by setting the elapsed times Vt and Ht to be values which are not zeros (for example, 40).

Next, the CPU 10 obtains an acceleration accX, an acceleration accY, and an acceleration accZ (step 42) and proceeds to the next step. For example, by using the operation information received from the controller 7, the CPU 10 stores, as the acceleration accX, the acceleration accY, and the acceleration accZ, accelerations indicated by pieces of the latest acceleration data contained in the operation information, in the acceleration data Da. Specifically, the acceleration indicated by the X axis direction acceleration data contained in the latest operation information received from the controller 7 is stored as the acceleration accX in the X axis direction acceleration data Da1. The acceleration indicated by the Y axis direction acceleration data contained in the latest operation information is stored as the acceleration accY in the Y axis direction acceleration data Da2. The acceleration indicated by the Z axis direction acceleration data contained in the latest operation information is stored as the acceleration accZ in the Z axis direction acceleration data Da3.

Next, the CPU 10 calculates a following acceleration vector accf (step 43) and proceeds to the next step. For example, referring to the acceleration accX stored in the X axis direction acceleration data Da1, the acceleration accY stored in the Y axis direction acceleration data Da2, and the acceleration accZ stored in the Z axis direction acceleration data Da3, the CPU obtains acceleration vectors acc. The CPU 10 refers to an X axis component, a Y axis component, and a Z axis component of the following acceleration vector accf already stored in the following acceleration vector data Db. The CPU 10 calculates a new following acceleration vector accf as shown below, $$accf \leftarrow accf + (acc - accf) * C$$

and updates the following acceleration vector data accf. Here, C is a following coefficient and for example, is set to be 0.15. As described above, the following acceleration vector accf has respective axis component values, which are obtained by following at a predetermined rate the axis component values (accX, accY, and accZ) of the acceleration vector acc at a current time, and is obtained by sequentially following at the predetermined rate the acceleration vector acc at the current time. In the above-mentioned calculation, the following acceleration vector accf is calculated as the vector which follows the acceleration vector acc. However, since the following coefficient C is a very small value, the following acceleration vector accf is a vector obtained by smoothing the X axis component accX, the Y axis component accY, and the Z axis component accZ of the acceleration vector acc. In addition, the following acceleration vector accf can be used as a parameter showing a component of a static acceleration such as the gravitational acceleration invariably acting on the controller 7.

Next, the CPU 10 calculates a following component removal vector vec (step 44) and proceeds to the next step. For example, the CPU 10 refers to the acceleration vector acc stored in the acceleration data Da and the following acceleration vector accf calculated at step 43 as mentioned above. The CPU 10 calculates the following component removal vector vec as shown below, $$vec \leftarrow acc - accf$$

and updates the following component removal vector data Dc. As is clear from the above-mentioned calculation, the following component removal vector vec is obtained by subtracting the following acceleration vector accf from the acceleration vector acc.

Next, the CPU 10 performs processing for calculating a pitching speed Vs indicating the player's number of steps per unit time (step 45) and proceeds to the next step. Hereinafter, with reference to FIG. 13, processing for calculating a pitching speed Vs, which is performed at step 45 as mentioned above, will be described.

As shown in FIG. 13, the CPU 10 calculates a gravity direction vector vecg (step 80) and proceeds to the next step. Specifically, by normalizing the following acceleration vector accf, stored in the following acceleration vector data Db, to be a vector having a length of 1 (one), the CPU 10 calculates the gravity direction vector vecg. And by using the calculated gravity direction vector vecg, the CPU 10 updates the gravity direction vector data Dd.

Next, the CPU 10 calculates a gravity direction component Vw of the following component removal vector vec (step 81) and proceeds to the next step. Specifically, the CPU 10 refers to the following component removal vector vec stored in the following component removal vector data Dc and the gravity direction vector vecg stored in the gravity direction vector data Dd and calculates the gravity direction component Vw as shown below.

$$Vw \leftarrow vecgX * vecX + vecgY * vecY + vecgZ * vecZ$$

And by using the calculated gravity direction component Vw, the CPU 10 updates the gravity direction component data De.

Next, the CPU 10 calculates an absolute value Vwa of the gravity direction component Vw (step 82) and proceeds to the next step. Specifically, by using the calculated absolute value Vwa of the gravity direction component Vw, the CPU 10 updates the absolute value data Df.

Next, the CPU 10 calculates an absolute value change amount Vwah (step 83) and proceeds to the next step. Specifically, by subtracting a final absolute value Vawl from the absolute value Vwa calculated at the above-mentioned step 82 and using the calculated absolute value change amount Vwah, the CPU 10 updates the absolute value change amount data Dh. As is made clear from the below description, the final absolute value Vwal has been stored in the final absolute value data Dg and is the absolute value Vwa calculated in the previous processing.

Next, the CPU 10 obtains an elapsed time Vt which has been passed from the pitching summit determined immediately before (step 84) and proceeds to the next step. Specifically, the CPU 10 refers to a count value of the pitching timer, stored in the pitching timer data Dw, and obtains the count value as the elapsed time Vt. And by using the obtained elapsed time Vt, the CPU 10 updates the from-pitching-peak elapsed time data Dj.

Next, the CPU 10 determines whether or not the absolute value Vwa is greater than a threshold value A (step 85). When the absolute value Vwa is greater than the threshold value A, the CPU 10 proceeds to the next step 86. On the other hand, when the absolute value Vwa is less than or equal to the threshold value A, the CPU 10 proceeds to the next step 93. Here, the threshold value A is one of conditions used when it is determined that the absolute value Vwa is that of a peak (pitching summit) and is set to be, for example, 0.5. In other words, even if the absolute value Vwa has changed, when the absolute value Vwa is less than or equal to the threshold value A, the absolute value Vwa is not determined as being that of the peak.

At step 86, the CPU 10 judges whether or not the final absolute value change amount Vwahl is greater than or equal to zero and whether or not the absolute value change amount Vwah is smaller than zero. In a case of Vahl≧0 and Vwah<0, the CPU 10 determines that the absolute value Vwa is that of the pitching summit and proceeds to the next step 87. On the other hand, In a case of Vahl<0 or Vwah≧0, the CPU 10 determines that the absolute value Vwa is not that of the pitching summit and proceeds to the next step 93. As is made clear from the below description, the final absolute value change amount Vwa is stored in the final absolute value change amount data Di and is the absolute value change amount Vwah calculated in the previous processing. In other words, at the above-mentioned step 85 and step 86, in a case where the absolute value Vwa is greater than the threshold value A and the absolute value Vwa stands at a local maximum obtained when the absolute value Vwa has changed from an increasing value to a decreasing value, it is determined that the absolute value Vwa is that of the pitching summit.

At step 87, the CPU 10 initializes a count value written in the pitching timer data Dw as zero. The CPU 10 judges whether or not the elapsed time Vt obtained at the above-mentioned step 84 is shorter than a shortest time Vtmin (for example, Vtmin=4) (step 88). In a case where the elapsed time Vt is shorter than the shortest time Vtmin, the CPU 10 replaces a value of the elapsed time Vt with a value of the shortest time Vtmin, updates the from-pitching-peak elapsed time data Dj (step 89), and proceeds to the next step 90. On the other hand, in a case where the elapsed time Vt is greater than or equal to the shortest time Vtmin, the CPU 10 directly proceeds to the next step 90.

At step 90, the CPU 10 calculates a target value Vsd of the pitching speed Vs and proceeds to the next step. For example, the CPU 10 refers to an elapsed time Vt stored in the from-pitching-peak elapsed time data Dj and calculates the target value Vsd as shown below, $$Vsd=M/Vt$$

wherein M is a first coefficient (for example, M=0.25). By using the calculated target value Vsd, the CPU 10 updates the pitching target value data Dk.

Next, the CPU 10 calculates a pitching speed Vs (step 91) and proceeds to the next step. For example, the CPU 10 refers to a target value Vsd of the pitching speed Vs stored in the pitching target value data Dk and the pitching speed Vs stored in the pitching speed data Dl and calculates a new pitching speed Vs as shown below.

$$Vs \leftarrow Vs+(Vsd-Vs)*0.3$$

By using the calculated new pitching speed Vs, the CPU 10 updates the pitching speed data Dl.

Next, at step 92, the CPU 10 replaces a value of the final absolute value Vwal with a value of the absolute value Vwa at a current time point, which has been stored in the gravity direction component absolute value data Df, and updates the final absolute value data Dg. The CPU 10 replaces a value of the final absolute value change amount Vwahl with a value of absolute value change amount Vwah at a current time point, which has been stored in the absolute value change amount data Dh, updates the final absolute value change amount data Di, and finishes the processing of the subroutine.

On the other hand, at step 93, the CPU 10 judges whether or not the elapsed time Vt obtained at the above-mentioned step 84 is longer than a longest time Vtmax (for example, Vtmax=20). In a case where the elapsed time Vt is longer than the longest time Vtmax, the CPU 10 proceeds to the next step 94. On the other hand, in a case where the elapsed time Vt is shorter than or equal to the longest time Vtmax, the CPU 10 proceeds to the above-mentioned step 91.

At step 94, the CPU 10 attenuates the pitching speed Vs and proceeds to the above-mentioned step 92. For example, the CPU 10 refers to the pitching speed Vs stored in the pitching speed data Dl and attenuates a new pitching speed Vs as shown below.

$$Vs \leftarrow Vs*0.9$$

By using the attenuated new pitching speed Vs, the CPU 10 updates the pitching speed data Dl.

Referring back to FIG. 12, after the processing for calculating the pitching speed Vs at step 45, the CPU 10 performs processing for calculating a rolling speed Hs indicating the player's number of steps per unit time (step 46) and proceeds to the next step. Hereinafter, with reference to FIG. 14, the processing for calculating the rolling speed Hs at the above-mentioned step 46 will be described.

As shown in FIG. 14, the CPU 10 calculates a horizontal direction component vector Hvec of the following component removal vector vec (step 100) and proceeds to the next step. Specifically, the CPU 10 refers to a following component removal vector vec stored in the following component removal vector data Dc, a gravity direction vector vecg stored in the gravity direction vector data Dd, and a gravity direction component Vw stored in the gravity direction component data De and calculates the horizontal direction component vector Hvec as shown below.

$$Hvec \leftarrow vec-vecg*Vw$$

By using the calculated horizontal direction component vector Hvec, the CPU 10 updates the horizontal direction component vector data Dm.

Next, the CPU 10 calculates a magnitude Hwa of the horizontal direction component vector Hvec (step 101) and proceeds to the next step. Specifically, the CPU 10 refers to the horizontal direction component vector data Dm, calculates the magnitude Hwa of the horizontal direction component vector Hvec, and by using the calculated magnitude Hwa, updates the horizontal direction component vector magnitude data Dn.

Next, the CPU 10 calculates a magnitude change amount Hwah (step 102) and proceeds to the next step. Specifically, by subtracting a final magnitude Hwal from the magnitude Hwa calculated at the above-mentioned step 101, the CPU 10 calculates the magnitude change amount Hwah and by using the calculated magnitude change amount Hwah, the CPU 10 updates the magnitude change amount data Dp. As is made clear from the below description, the final magnitude Hwal has been stored in the final magnitude data Do and is the magnitude Hwa calculated in the previous processing.

Next, the CPU 10 obtains an elapsed time Ht which has passed from the rolling summit determined immediately before (step 103) and proceeds to the next step. Specifically, the CPU 10 refers to a count value of the rolling timer, which has been stored in the rolling timer data Dx, and obtains the count value as the elapsed time Ht. By using the obtained elapsed time Ht, the CPU 10 updates the from-rolling-peak elapsed time data Dr.

Next, the CPU 10 judges whether or not a magnitude Hw is greater than a threshold value B (step 104). In a case where the magnitude Hw is greater than the threshold value B, the CPU 10 proceeds to the next step 105. On the other hand, in a case where the magnitude Hw is less than or equal to the threshold value B, the CPU 10 proceeds to the next step 112. Here, the threshold value B is one of conditions used when it is determined that the magnitude Hwa is that of a peak (rolling summit) and is set to be, for example, 3.0. In other words, even if the magnitude Hwa has changed, when the magnitude Hwa is less than or equal to the threshold value B, the magnitude Hwa is not determined as being that of the peak. Note that it is preferable that the threshold value B is set to be a value greater than the above-mentioned threshold value A. This is because differences in swinging magnitudes of the pitching and the rolling (the swinging magnitude of the rolling in a state where the controller 7 is held is greater than that of the pitching) and in swinging periods (the period of the pitching is half the period of the rolling) are taken into account. It is only required that the threshold values A and B are set to be appropriate values respectively in accordance with sensitivities of determining the swinging.

At step 105, the CPU 10 judges whether or not a final magnitude change amount Hwahl is greater than or equal to zero and a magnitude change amount Hwah is less than zero. In a case of Hwahl≧0 and Hwah<0, the CPU 10 determines that the magnitude Hwa is that of the rolling summit and proceeds to the next step 106. On the other hand, In a case of Hwahl<0 or Hwah≧0, the CPU 10 determines that the magnitude Hwa is not that of the rolling summit and proceeds to the next step 112. As is made clear from the below description, the final magnitude change amount Hwahl has been stored in the final magnitude change amount data Dq and is the magnitude change amount Hwah calculated in the previous processing. In other word, at the above-mentioned step 104 and step 105, in a case where the magnitude Hwa is greater than the threshold value B and the magnitude Hwa stands at a local maximum obtained when the magnitude Hwa has changed from an increasing value to a decreasing value, it is determined that the magnitude Hwa is that of the rolling summit.

At step 106, the CPU 10 initializes a count value written in the rolling timer data Dx as zero. The CPU 10 judges whether or not the elapsed time Ht obtained at the above-mentioned step 103 is shorter than a shortest time Htmin (for example, Htmin=8) (step 107). In a case where the elapsed time Ht is shorter than the shortest time Htmin, the CPU 10 replaces the value of the elapsed time Ht with a value of the shortest time Htmin, updates the from-rolling-peak elapsed time data Dr (step 108), and proceeds to the next step 109. On the other hand, in a case where the elapsed time Ht is greater than or equal to the shortest time Htmin, the CPU 10 directly proceeds to the next step 109.

At step 109, the CPU 10 calculates a target value Hsd of the rolling speed Hs and proceeds to the next step. For example, the CPU 10 refers to the elapsed time Ht stored in the from-rolling-peak elapsed time data Dr and calculate the target value Hsd as shown below, $$Hsd=N/Ht$$

wherein N is a second coefficient (for example, N=0.5). By using the calculated target value Hsd, the CPU 10 updates the rolling target value data Ds.

Next, the CPU 10 calculates a rolling speed Hs (step 110) and proceeds to the next step. For example, the CPU 10 refers to the target value Hsd of the rolling speed Hs, which has been stored in the rolling target value data Ds, and the rolling speed Hs, which has been stored in the rolling speed data Dt, and calculates a new rolling speed Hs as shown below.

$$Hs \leftarrow Hs+(Hsd-H)*0.3$$

By using the calculated new rolling speed Hs, the CPU 10 updates the rolling speed data Dt.

Next, at step 111, the CPU 10 replaces the final magnitude Hwal with the value of the magnitude Hwa at a current time point, which has been stored in the horizontal direction component vector magnitude data Dn and updates the final magnitude data Do. The CPU 10 replaces the final magnitude change amount Hwahl with the value of the magnitude change amount Hwah at the current time point, which has been stored in the magnitude change amount data Dp, updates the final magnitude change amount data Dq, and finishes the processing of the subroutine.

On the other hand, at step 112, the CPU 10 judges whether or not the elapsed time Ht obtained at the above-mentioned step 103 is longer than a longest time Htmax (for example, Htmax=40). In a case where the elapsed time Ht is longer than the longest time Htmax, the CPU 10 proceeds to the next step 113. On the other hand, in a case where the elapsed time Ht is shorter than or equal to the longest time Htmax, the CPU 10 proceeds to the above-mentioned step 110.

At step 113, the CPU 10 attenuates the rolling speed Hs and proceeds to the above-mentioned step 92. For example, the CPU 10 refers to the rolling speed Hs stored in the rolling speed data Dt and attenuates a new rolling speed Hs as shown below.

$$Hs \leftarrow Hs*0.9$$

By using the attenuated new rolling speed Hs, the CPU 10 updates the rolling speed data Dt.

Figure 15A:
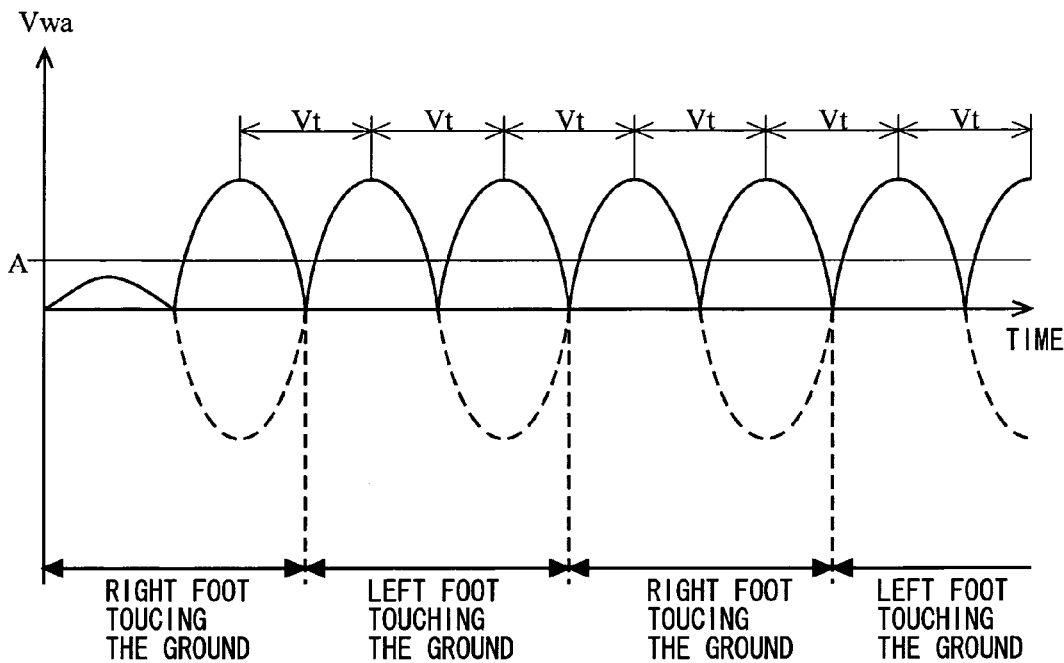
FIG. 15A is a graph showing one example of a change in an absolute value Vwa of a gravity direction component Vw in a state where the pitching occurs on the controller 7.
Figure 15B:
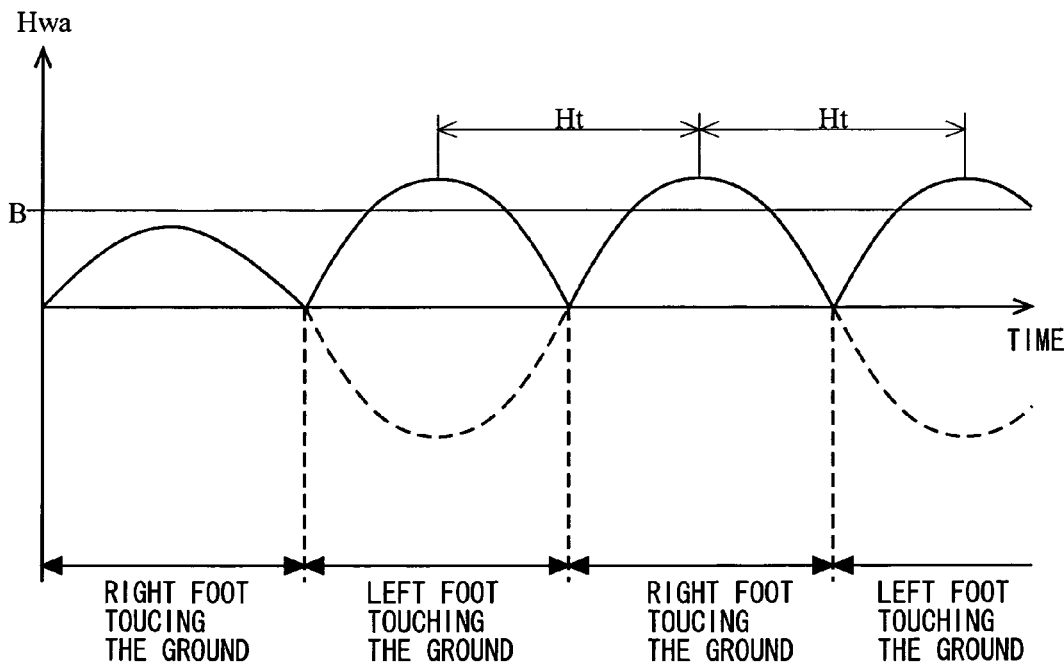
FIG. 15B is a graph showing one example of a change in a magnitude Hwa of a horizontal direction component vector Hvec in a state where the rolling occurs on the controller 7.

Here, with reference to FIGS. 15A and 15B, a basic principle of the above-described processing for calculating the pitching speed Vs and the rolling speed Hs will be described. FIG. 15A is a graph showing one example of a change of the absolute value Vwa of the gravity direction component Vw in a state where the pitching is occurring on the controller 7. FIG. 15B is a graph showing one example of a change of the magnitude Hwa of the horizontal direction component vector Hvec in a state where the rolling is occurring on the controller 7.

In FIG. 15A, the gravity direction component Vw is a parameter showing a gravity direction component in an acceleration occurring on the controller 7. With respect to the absolute value Vwa of the gravity direction component Vw, a minus of a negative component of the gravity direction component Vw is reversed to a plus. In other words, a period of the cycle in which the absolute value Vwa of the gravity direction component Vw changes results in a half of a period of the cycle (indicated by a broken line in FIG. 15A) in which the gravity direction acceleration acting on the controller 7, which is shown in FIG. 9A, changes. Accordingly, with attention paid to the period of the cycle of the absolute value Vwa, two cycles in which the absolute value Vwa peaks occur per step made by the player. Supposing that a first coefficient M which is a numerator used when the target value Vsd is calculated supposing that each (elapsed time Vt) of the time intervals between the peaks of the absolute value Vwa is a time period passing when the player makes a half step is, for example, 0.25, the pitching speed Vs showing the player's number of steps per unit time is calculated.

On the other hand, in FIG. 15B, the horizontal direction component vector Hvec is a parameter showing a component of a planar direction (horizontal direction component) which is perpendicular to the gravity direction of the acceleration occurring on the controller 7. In addition, with respect to the magnitude Hwa of the horizontal direction component vector Hvec, since no negative component is present, a change thereof occurs such that a minus of a negative component of the horizontal direction acceleration shown in FIG. 9B is reversed to a plus. In other words, a period of a cycle (indicated by a broken line in FIG. 15B) in which the magnitude Hwa of the horizontal direction component vector Hvec changes results in a half of that of a cycle in which the horizontal direction acceleration acting on the controller 7, which is shown in FIG. 9B, changes. Accordingly, with attention paid to the period of the cycle of the magnitude Hwa, one cycle in which the magnitude Hwa peaks occur per step made by the player. Supposing that a second coefficient N which is a numerator used when the target value Hsd is calculated supposing that each (elapsed time Ht) of the time intervals between the peaks of the magnitude Hwa is a time period passing when the player makes one step is a value different from the first coefficient M (for example, N=0.5), the rolling speed Hs showing the player's number of steps per unit time is calculated.

As described above, by paying attention to timing at which the local maximum of the absolute value Vwa, which is present only as the positive value of the pitching speed Vs, results and to timing at which the local maximum of the magnitude Hwa, which is present only as the positive value of the rolling speed Hs, results, the pitching speed Vs and the rolling speed Hs are calculated from the intervals between the local maximums. Owing to this, it is made possible to use the local maximums which result two times more often than the local maximums of the acceleration changes shown in FIGS. 9A and 9B result, thereby enhancing accuracy of calculating the pitching speed Vs and the rolling speed Hs. In addition, in a case where a change of the gravity direction component Vw is used as it is, the processing for detecting the local minimums of the gravity direction component Vw is required. In this case, through detecting only the local maximums, the processing for calculating the pitching speed Vs and the processing for calculating the rolling speed Hs are simplified, thereby allowing the processing thereof to be very efficient. In a case where these effects are not expected, a change of the gravity direction component Vw may be used as it is, to calculate the pitching speed Vs.

In addition, in the processing for calculating the pitching speed Vs at the above-mentioned step 91, the calculation is conducted such that the pitching speed Vs gradually approximates to the target value Vsd. Also in the processing for calculating the rolling speed Hs at the above-mentioned step 110, the calculation is conducted such that the rolling speed Hs gradually approximates to the target value Hsd. This is, in order to reduce influence which period changes occurring in short periods of time (i.e., changes in the elapsed time Vt and the elapsed time Ht) exert on the calculation results of the pitching speed Vs and the rolling speed Hs. In a case where such an effect is not expected, in the processing for calculating the pitching speed Vs at the above-mentioned step 91, the target value Vsd may be used, as the pitching speed Vs, as it is. In addition, in the processing for calculating the rolling speed Hs at the above-mentioned step 110, the target value Hsd may be used, as the rolling speed Hs, as it is.

Referring back to FIG. 12, after the processing for calculating the rolling speed Hs at step 46, the CPU 10 judges whether or not the pitching speed Vs is greater than the rolling speed Hs (step 47). Specifically, the CPU 10 compares the pitching speed Vs stored in the pitching speed data Dl and the rolling speed Hs stored in the rolling speed data Dt and judges whether or not the pitching speed Vs is greater than the rolling speed Hs. In a case of Vs>Hs, the CPU 10 proceeds to the next step 48. On the other hand, in a case of Vs≦Hs, the CPU 10 proceeds to the next step 49.

At step 48, the CPU 10 adds the pitching speed Vs to the step count St and proceeds to the next step 50. Specifically, the CPU 10 refers to the pitching speed Vs stored in the pitching speed data Dl and the step count St stored in the step count data Du and calculates a new step count St as shown below.

$$St \leftarrow St + Vs$$

By using the calculated new step count St, the CPU 10 updates the step count data Du.

On the other hand, at step 49, the CPU 10 adds the rolling speed Hs to the step count St and proceeds to the next step 50. Specifically, the CPU 10 refers to the rolling speed Hs stored in the rolling speed data Dt and the step count St stored in the step count data Du and calculates a new step count St as shown below.

$$St \leftarrow St + Hs$$

By using the calculated new step count St, the CPU 10 updates the step count data Du.

As described above, in the processing at the above-mentioned step 47 through step 49, the pitching speed Vs and the rolling speed Hs are compared and either one thereof, whose speed is faster than the other, is added to the step count St, thereby calculating the new step count St. For example, in a case where the controller 7 is attached to the player's waist or the like, since the rolling occurring on the controller 7 is hardly detected, the rolling speed Hs is decreased and it is more likely that the pitching speed Vs is selected to be added to the step count St. On the other hand, in a case where the controller 7 is held by the player's hand, since large rolling occurring on the controller 7 is detected, the rolling speed Hs is increased and it is more likely that the rolling speed Hs is selected to be added to the step count St.

At step 50, by using the step count St added at step 48 or step 49, the CPU 10 causes the player character PC to move in the virtual game space, displays the player character PC on the monitor 2, and proceeds to the next step. Specifically, the CPU 10 refers to the step count St stored in the step count data Du and causes the player character PC to perform a motion/to move making steps whose number is in accordance with the step count St. The CPU 10 determines a position of the player character PC in the virtual game space and updates the player character position data Dv. The CPU 10 displays on the monitor 2 the virtual game space having the player character PC arranged therein (see FIG. 10).

Next, the CPU 10 adds one to each of the count value stored in the pitching timer data Dw and the count value stored in the rolling timer data Dx and updates the pitching timer data Dw and the rolling timer data Dx (step 51). The CPU 10 judges whether or not to finish the game (step 52). The game is finished on the condition, for example, that conditions of "game over" are satisfied; and that the player performs an operation of finishing the game. When the game is not finished, the CPU 10 returns to the above-mentioned step 42 and repeats the processing. When the game is finished, the CPU 10 finished the processing shown in the flow charts.

As described above, by using the data outputted from the acceleration sensor 701 built in the controller 7, the above-described game processing allows accurate determination of the step count of the player with the controller 7 attached or with the controller 7 held. For example, even if the controller 7 is attached to a part of the player's body where accelerations in accordance with up-and-down movement of the player's body mainly occur and even if the controller 7 is held by a part of the player's body where accelerations caused when the player swings his or her arm mainly occur, the above-described game processing allows correct calculation of the player's step count and free handling of the controller 7 without restricting a manner in which the player carries the controller 7.

Figure 16:
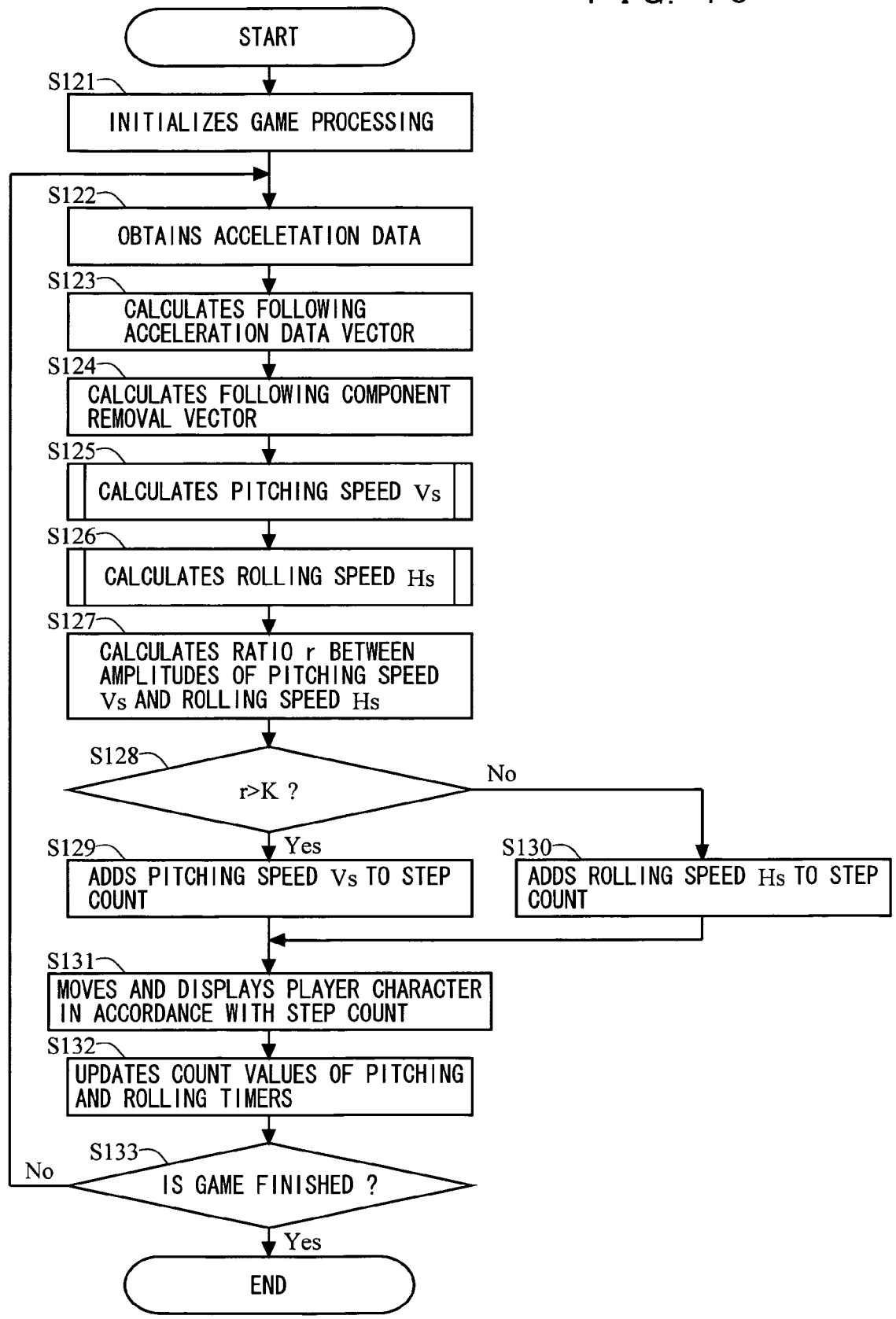
FIG. 16 is a flow chart showing another example of a flow of game processing executed by the game apparatus body 5.

In the above-described game processing, by comparing the pitching speed Vs and the rolling speed Hs, it is determined which is mainly occurring on the controller 7, the pitching or the rolling. However, by comparing other parameters, it may be determined which is mainly occurring on the controller 7, the pitching or the rolling. Hereinafter, with reference to FIG. 16, game processing in which by comparing other parameters, it is determined which is mainly occurring on the controller 7, the pitching or the rolling will be described. FIG. 16 is a flowchart showing another example of a flow of the game processing executed in the game apparatus body 5.

In FIG. 16, since processing at step 121 through step 126 is the same as the processing at the above-mentioned step 41 through step 46, which is described with reference to FIG. 12, detailed description thereof will be omitted. After processing for calculating a rolling speed Hs at step 126, the CPU 10 proceeds to the next step 127.

At step 127, the CPU 10 calculates a ratio r of an amplitude of a pitching speed Vs to an amplitude of the rolling speed Hs and proceeds to the next step. For example, the CPU 10 obtains, as an amplitude ampV of the pitching speed Vs, an immediately preceding local maximum of a changing absolute value Vwa of a gravity direction component Vw. The CPU 10 obtains, as an amplitude ampH of the rolling speed Hs, an immediately preceding local maximum of a changing magnitude Hwa of a horizontal direction component vector Hvec. By using the amplitude ampV of the pitching speed Vs and the amplitude ampH of the rolling speed Hs, the CPU 10 calculates the ratio r as shown below.

$$r=ampV/ampH$$

Next, the CPU 10 judges whether or not the ratio r calculated at the above-mentioned step 127 is greater than a coefficient K (step 128). For example, a ratio r in a case where a player makes steps with the controller 7 attached to the player and a ratio r in a case where the player makes steps with controller 7 held by the player are experimentally calculated. A threshold value which can distinguish between these ratios r is previously set as the coefficient K. In a case of r>K, the CPU 10 proceeds to the next step 129. On the other hand, in a case of r≦K, the CPU 10 proceeds to the next step 130.

Since processing at step 129 through step 133 is the same as the processing at the above-mentioned step 48 through step 52, which is described with reference to FIG. 12, detailed description thereof will be omitted.

As described above, in this example of the game processing, the ratios between the amplitude ampV of the pitching speed Vs and the amplitude ampH of the rolling speed Hs are used and a value whose amplitude ratio is greater than or equal to a predetermined value is added to a step count St, thereby calculating a new step count St. For example, in a case where the controller 7 is attached to the player's waist or the like, since the rolling occurring on the controller 7 is hardly detected, the amplitude ampH of the rolling speed Hs is decreased and it is more likely that the pitching speed Vs is selected to be added to the step count St. On the other hand, in a case where the controller 7 is held by the player's hand, since large rolling occurring on the controller 7 is detected, the amplitude ampH of the rolling speed Hs is increased and it is more likely that the rolling speed Hs is selected to be added to the step count St.

Figure 17:
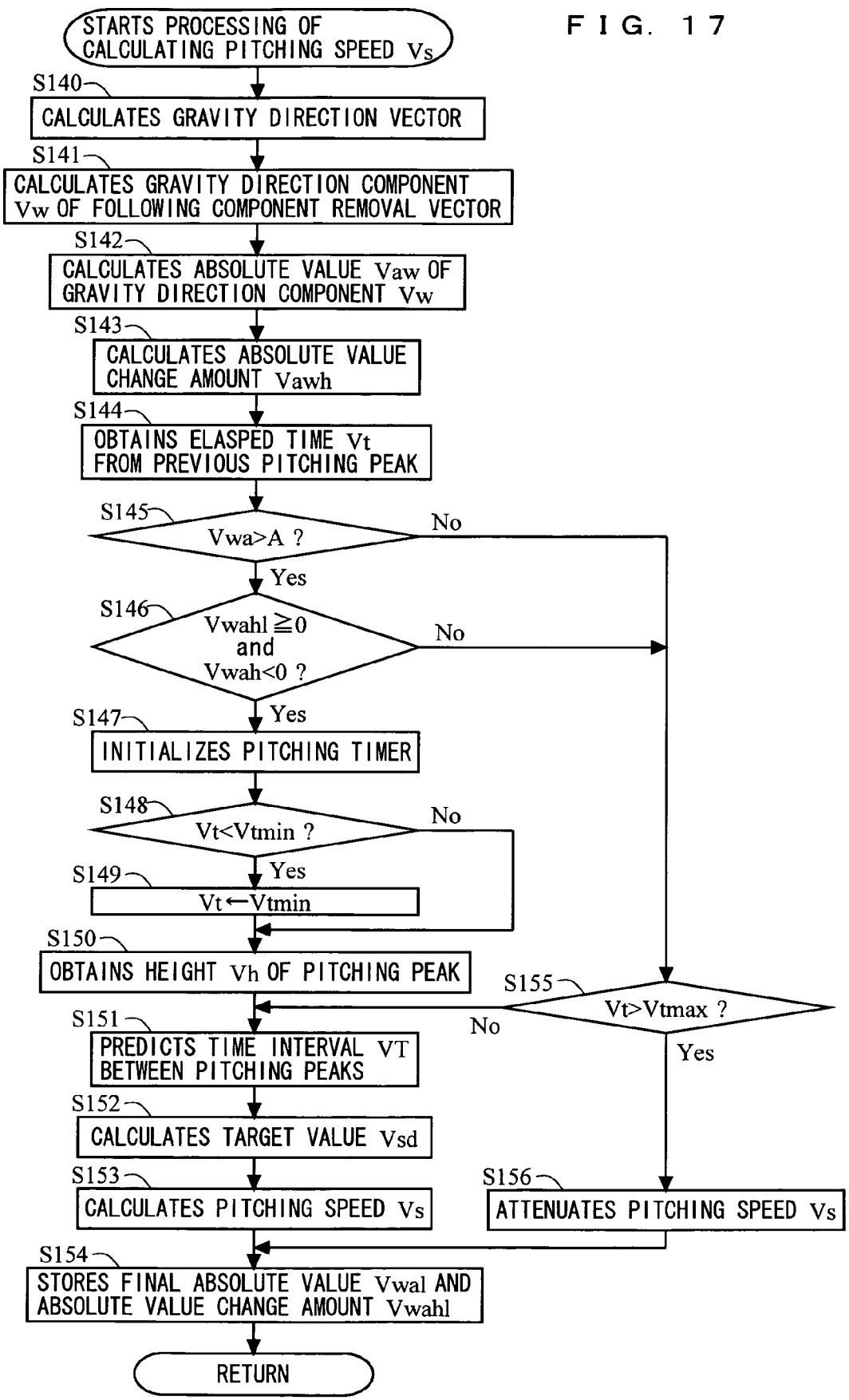
FIG. 17 indicates a subroutine showing detailed operations in another example of processing for calculating a pitching speed Vs at step 45 in FIG. 12 or step 125 in FIG. 16.
Figure 18:
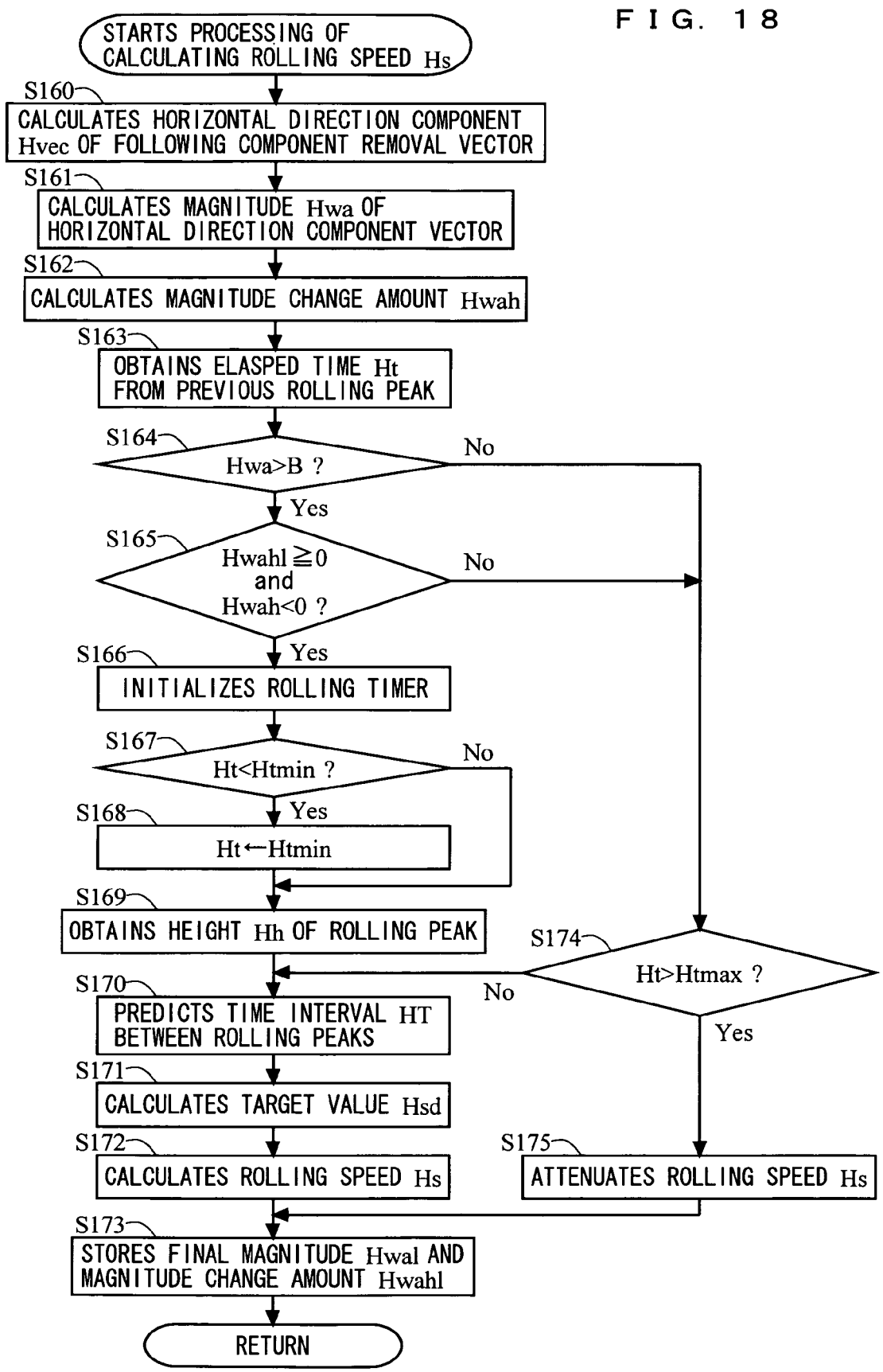
FIG. 18 indicates a subroutine showing detailed operations in another example of processing for calculating a rolling speed Hs at step 46 in FIG. 12 or step 126 in FIG. 16.

In the above-described game processing, the pitching speed Vs is calculated by using the intervals at which the local maximums of the absolute value Vwa of the gravity direction component Vw result and the rolling speed Hs is calculated by using the intervals at which the local maximums of the magnitude Hwa of the horizontal direction component vector Hvec result. However, the pitching speed Vs and the rolling speed Hs may be calculated by employing another method. Hereinafter, with reference to FIGS. 17 and 18, another example of processing for calculating the pitching speed Vs and the rolling speed Hs will be described. FIG. 17 shows a subroutine and details operations performed in another example of processing for calculating the pitching speed Vs at step 45 in FIG. 12 or at step 125 in FIG. 16. FIG. 18 shows a subroutine and details operations performed in another example of processing for calculating the rolling speed Hs at step 46 in FIG. 12 or at step 126 in FIG. 16.

In FIG. 17, since processing at step 140 through step 149 is the same as the processing at the above-mentioned step 80 through step 89, which is described with reference to FIG. 13, detailed description thereof will be omitted. After it has been judged at step 148 that the elapsed time Vt is greater than or equal to the shortest time Vtmin or after the value of the elapsed time Vt has been replaced with the value of the shortest time Vtmin at step 149, the CPU 10 proceeds to the next step 150.

At step 150, the CPU 10 obtains a height Vh of a pitching summit and proceeds to the next step. Specifically, by using an final absolute value Vwal calculated in the previous processing, the CPU 10 obtains the value as the height Vh of the pitching summit.

Figure 19:
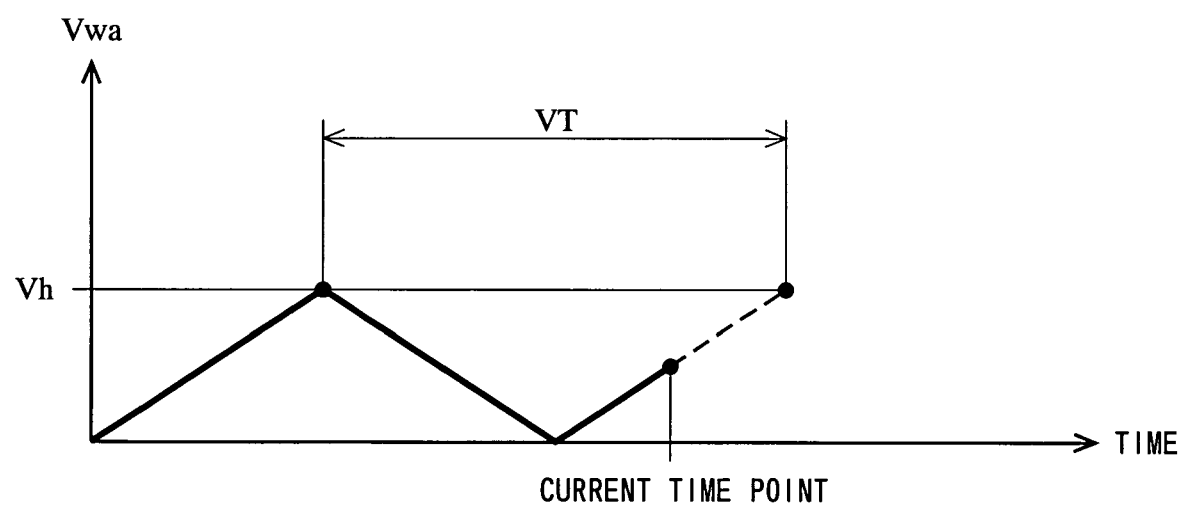
FIG. 19 is a diagram showing one example in which a time interval VT between an immediately preceding local maximum of an absolute value Vwa and a next resulting local maximum of the absolute value Vwa is predicted.

Next, the CPU 10 predicts a time interval VT at which the pitching summits result (step 151) and proceeds to the next step. For example, as shown in FIG. 19, by assuming that a change of the absolute value Vwa shows a linear waveform, at the above-mentioned step 151, the CPU 10 predicts the time interval VT from an immediately preceding local maximum of the absolute value Vwa to a next resulting local maximum of the absolute value Vwa. For example, the CPU 10 calculates the time interval VT as shown below, $$VT=Vh*2/|d|$$

wherein d is a difference value between an absolute value Vwa at a current time point and an absolute value Vwa at a last time point (i.e., a change amount of the absolute value Vwa per frame). As is clear from FIG. 19, the change amount of the absolute value Vwa with respect to the time interval VT is double the height Vh of the pitching summit. In other words, since |d|*VT=2*Vh results, the time interval VT can be obtained in a manner as shown above.

Next, the CPU 10 calculates a target value Vsd of the pitching speed Vs (step 152) and proceeds to the next step. For example, the CPU 10 refers to the elapsed time Vt stored in the from-pitching-peak elapsed time data Dj and calculates the target value Vsd as shown below, $$Vsd=M/Vt$$

wherein M is a first coefficient (for example, M=0.25). By using the calculated target value Vsd, the CPU 10 updates the pitching target value data Dk.

Next, the CPU 10 calculates a pitching speed Vs (step 153) and proceeds to the next step. For example, the CPU 10 refers to the target value Vsd of the pitching speed Vs, stored in the pitching target value data Dk, and the pitching speed Vs stored in the pitching speed data Dl and calculates a new pitching speed Vs as shown below.

$$Vs \leftarrow Vs+(Vsd-Vs)*0.1$$

By using the calculated new pitching speed Vs, the CPU 10 updates the pitching speed data Dl.

In the processing for calculating the pitching speed Vs at the above-mentioned step 153, in the same manner as at step 91, the calculation is conducted such that the pitching speed Vs gradually approximates to the target value Vsd. This is in order to reduce influence which is caused when a period changes in a short time (i.e., a change in the time interval VT) exerts on the calculation result of the pitching speed Vs. As shown in FIG. 19, since the time interval VT is predicted by assuming that the absolute value Vwa changes in a linear manner, the waveform thereof is different from an actual waveform and a calculation error is increased around each of the local maximums. However, the calculation conducted such that the pitching speed Vs gradually approximates to the target value Vsd allows the error to be absorbed. If such an effect is not expected, in the processing for calculating the pitching speed Vs at the above-mentioned step 153, the target value Vsd may be used, as the pitching speed Vs, as it is.

Next, at step 154, the CPU 10 replaces a value of the final absolute value Vwal with a value of the absolute value Vwa at a current time point, which has been stored in the gravity direction component absolute value data Df, and updates the final absolute value data Dg. The CPU 10 replaces a value of the final absolute value change amount Vwahl with a value of the absolute value change amount Vwah at a current time point, which has been stored in the absolute value change amount data Dh, updates the final absolute value change amount data Di, and finishes the processing of the subroutine.

On the other hand, in a case where the absolute value Vwa is less than or equal to the threshold value A (No step 145) or where the absolute value Vwa is greater than or equal to the final absolute value Vwal (No at step 146), processing at step 155 is performed. At step 155, the CPU 10 judges whether or not the elapsed time Vt obtained at the above-mentioned step 144 is longer than a longest time Vtmax (for example, Vtmax=20). In a case where the elapsed time Vt is longer than the longest time Vtmax, the CPU 10 proceeds to the next step 156. On the other hand, in a case where the elapsed time Vt is less than or equal to the longest time Vtmax, the CPU 10 proceeds to the above-mentioned step 151.

At step 156, the CPU 10 attenuates the pitching speed Vs and proceeds to the above-mentioned step 154. For example, the CPU 10 refers to the pitching speed Vs stored in the pitching speed data Dl and attenuates a new pitching speed Vs as shown below.

$$Vs \leftarrow Vs*0.9$$

By using the attenuated new pitching speed Vs, the CPU 10 updates the pitching speed data D1.

At FIG. 18, since processing at step 160 through step 168 is the same as the processing at the above-mentioned step 100 through step 108, which is described with reference to FIG. 16, detailed description thereof will be omitted. After it has been judged at step 167 that the elapsed time Ht is greater than or equal to the shortest time Htmin or after a value of the elapsed time Ht has been replaced with the value of the shortest time Htmin at step 168, the CPU 10 proceeds to the next step 169.

At step 169, the CPU 10 obtains a height Hh of the rolling summit and proceeds to the next step. Specifically, by using the value of the final magnitude Hwal, which has been calculated in the previous processing, the CPU 10 obtains the value as the height Hh of the rolling summit.

Next, the CPU 10 predicts a time interval HT of the rolling summit (step 170) and proceeds to the next step. For example, in the same manner as assumed when predicting the absolute value Vwa, by assuming that a change of the magnitude Hwa shows a linear waveform, at the above-mentioned step 170, the CPU 10 predicts the time interval HT from an immediately preceding local maximum of the magnitude Hwa to a next resulting local maximum of the magnitude Hwa. For example, the CPU 10 calculates the time interval HT as shown below, $$HT=Hh*2/|e|$$

wherein e is a difference value between a magnitude Hwa at a current time point and a magnitude Hwa at a last time point (i.e., a change amount of the magnitude Hwa per frame).

Next, the CPU 10 calculates a target value Hsd of the rolling speed Hs (step 171) and proceeds to the next step. For example, the CPU 10 refers to the elapsed time Ht stored in the from-rolling-peak elapsed time data Dr and calculates the target value Hsd as shown below, $$Hsd=N/Ht$$

wherein N is a second coefficient (for example, N=0.5). By using the calculated target value Hsd, the CPU 10 updates the rolling target value data Ds.

Next, the CPU 10 calculates a rolling speed Hs (step 172) and proceeds to the next step. For example, the CPU 10 refers to a target value Hsd of the rolling speed Hs, which has been stored in the rolling target value data Ds, and the rolling speed Hs stored in the rolling speed data Dt and calculates a new rolling speed Hs as shown below.

$$Hs \leftarrow Hs+(Hsd-Hs)*0.1$$

By using the calculated new rolling speed Hs, the CPU 10 updates the rolling speed data Dt.

In the processing for calculating the rolling speed Hs at the above-mentioned step 172, in the same manner as at step 110, the calculation is conducted such that the rolling speed Hs gradually approximates to the target value Hsd. This is in order to reduce influence which is caused when a period changes in a short time (i.e., a change in the time interval HT) exerts on the calculation result of the rolling speed Hs. In addition, since the time interval HT is predicted by assuming that the magnitude Hwa changes in a linear manner, the waveform thereof is different from an actual waveform and a calculation error is increased around each of the local maximums. However, the calculation conducted such that the rolling speed Hs gradually approximates to the target value Hsd allows the error to be absorbed. If such an effect is not expected, in the processing for calculating the rolling speed Hs at the above-mentioned step 172, the target value Hsd may be used, as the rolling speed Hs, as it is.

Next, at step 173, the CPU 10 replaces a value of the final magnitude Hwal with a value of the magnitude Hwa at a current time point, which has been stored in the horizontal direction component vector magnitude data Dn, and updates the final magnitude data Do. The CPU 10 replaces with a value of the final magnitude change amount Hwahl with a value of the magnitude change amount Hwah, which has been stored in the magnitude change amount data Dp, updates the final magnitude change amount data Dq, and finishes the processing of the subroutine.

On the other hand, in a case where the magnitude Hwa is less than or equal to the threshold value B (No at step 164) or where the magnitude Hwa is greater than or equal to the final magnitude Hwal (No at step 165), processing at step 174 is performed. At step 174, the CPU 10 judges whether or not the elapsed time Ht obtained at the above-mentioned step 163 is longer than a longest time Htmax (for example, Htmas=40). In a case where the elapsed time Ht is longer than the longest time Htmax, the CPU 10 proceeds to the next step 175. On the other hand, in a case where the elapsed time Ht is less than or equal to the longest time Htmax, the CPU 10 proceeds to the above-mentioned step 170.

At step 175, the CPU 10 attenuates the rolling speed Hs and proceeds to the above-mentioned step 173. For example, the CPU 10 refers to the rolling speed Hs stored in the rolling speed data Dt and attenuates a new rolling speed Hs as shown below.

$$Hs \leftarrow Hs*0.9$$

By using the attenuated new rolling speed Hs, the CPU 10 updates the rolling speed data Dt.

In the above-described processing, by using the local maximums of the absolute value Vwa of the gravity direction component Vw, the time interval VT between the local maximums is predicted and the pitching speed Vs is calculated. In addition, by using the local maximums of the magnitude Hwa of the horizontal direction component vector Hvec, the time interval HT between the local maximums is predicted and the rolling speed Hs is calculated. Also utilizing the period prediction in which these local maximums are used allows the pitching speed Vs and the rolling speed Hs to be calculated.

In the above-described processing for calculating the step count, in a case where the elapsed time Vt obtained when the pitching summit is detected is longer than the longest time Vtmax and in a case where the elapsed time Ht obtained when the rolling summit is detected is longer than the longest time Htmax, the processing in which the pitching speed Vs and the rolling speed Hs are respectively attenuated is performed. This processing is to judge that the player is not making steps with the controller 7 attached or held when the time from when immediately preceding pitching summit and rolling summit are detected until when next pitching summit and rolling summit are detected is long. As for the values of the longest time Vtmax and the longest time Htmax it is only required to set threshold values in accordance with processing periods or the like in order to make the above-mentioned judgment. The above-mentioned example of setting the values (Vtmax=20 and Htmax=40) is one example in which the processing for detecting the local maximum is performed per 1/200 second.

In the above-described processing for calculating the step count, in a case where the elapsed time Vt obtained when the pitching summit is detected is shorter than the shortest time Vtmin and in a case where the elapsed time Ht obtained when the rolling summit is detected is shorter than the shortest time Htmin, the elapsed time Vt and the elapsed time Ht are changed to the shortest time Vtmin and the shortest time Htmin to be processed. This is to cope with a case where a local maximum which would be unlikely to result when premising that the player makes steps with the controller 7 attached or held is detected. As for the values of the shortest time Vtmin ands the shortest time Htmin, it is only required to set threshold values in accordance with processing periods or the like in order to cope with the above-mentioned case. The above-mentioned example of setting the values (Vtmin=4 and Htmin=8) is one example in which the processing for detecting the local maximum is performed per 1/200 second.

The step count St calculated in the above-described processing for calculating the step count is a parameter in a case where a motion in which the player character PC in the virtual game space moves by making two steps is counted as one St (for example, a motion made from when the player character PC makes a step with his or her right foot, to when the player character PC makes a step with his or her left foot, and to when the player character PC makes a step again with his or her right foot). In accordance with this definition of the step count St, the first coefficient M and the second coefficient N used when calculating the target value Vsd and the target value Hsd are set. Accordingly, it is only required to set, in accordance with the definition of the above-mentioned step count St, the first coefficient M and the second coefficient N used when calculating the target value Vsd and the target value Hsd. For example, in a case where a motion made when the player character PC in the virtual game space moves by making one step is counted as one St, the first coefficient M used when calculating the target value Vsd and the second coefficient N used when calculating the target value Hsd may be set to be 0.5 and 1.0, respectively.

In the above-described processing for calculating the step count, the pieces of the acceleration data, which can be obtained from the acceleration sensor 701, indicating respectively the accelerations in the three-axis directions are used. However, pieces of acceleration data indicating respectively accelerations in two-axis directions may be used. In this case, accelerations occurring in directions perpendicular to the two-axis directions cannot be analyzed. However, since a state where the accelerations occur only in the directions perpendicular to the two-axis directions is very rare, even when the pieces of the acceleration data in the two-axis directions are used, the same processing as that performed when using the pieces of the acceleration data in the three-axis directions is enabled.

In the above-described processing for calculating the step count, the example in which the number of steps is measured in a state where the player makes steps with the controller 7 attached or held is used. However, needless to say, the step count calculation processing of an example embodiment of the present invention enables measurement of the number of steps made when in reality, the player walks, jogs, runs, or does others with the controller 7 attached or held.

In the above-described processing for calculating the step count, the example in which the player character PC moves with the step count St used as the game parameter is shown. The game parameter may be used in other processing. For example, if the value of the step count St, calculated in the step count calculation processing, is displayed on a given display unit as an accumulated step count made by the player, an example embodiment of the present invention can be used as a simple pedometer. The value of the step count St as well as the pitching speed Vs and rolling speed Hs indicating the number of steps made per unit time, calculated in the step count calculation processing, may be used as other game parameters pertinent to motions of the player character PC.

In the above description, the example in which the step count calculation processing is performed by using the stationary game apparatus body 5 is shown. However, it is possible to apply the step count calculation processing to a hand-held game apparatus. For example, an acceleration sensor is mounted on a body of the hand-held game apparatus and when a user makes steps, walks, jogs, runs, or does others with the body thereof attached or held, step count calculation processing is executed by using outputs from the acceleration sensor. A value of the calculated step count St is displayed on a display unit provided on the hand-held game apparatus, or game processing in which the step count St is used is performed by using the hand-held game apparatus. As described above, an example embodiment of the present invention is suitable when applied in a case where the hand-held game apparatus or the like is utilized as a pedometer or where a game is played.

In the above description, the example in which the acceleration data is transmitted from the controller 7 which is not integrated in the game apparatus body 5 and the step count is calculated in the game apparatus body 5 in a real-time manner by using the acceleration data is shown. However, in other manner, the step count may be calculated. For example, the step count calculation processing may be performed in the following manner: recording means for recording acceleration data for a predetermined period of time in chronological order is mounted in the controller 7 and acceleration data which is accumulated for the predetermined period of time in the recording means mounted in the controller 7 is appropriately read out. As described above, such a configuration which allows the acceleration data for the predetermined period of time to be recorded in the controller 7 is made, whereby when a user is carrying the controller 7, the acceleration data obtained when the user is carrying the controller 7 is thereafter read in the game apparatus body 5 and the calculation of the step count at the time when the user is carrying the controller 7 is enabled.

In the above description, the example in which the acceleration data is transmitted from the controller 7 to the game apparatus body 5 is shown. Other data may be transmitted from the controller 7 to the game apparatus body 5. For example, a step count or midway information obtained before the step count is calculated may be calculated in the controller 7 and data indicating the calculated step count and information may be transmitted to the game apparatus body 5. As described above, in a case of the configuration which allows the data for the predetermined period of time to be recorded in the controller 7, the above-mentioned step count St and midway information obtained before the step count is calculated are recorded in the controller 7, whereby similarly, the step count calculation processing in which the information is appropriately read out in the game apparatus body 5 is enabled.

In the above description, the example in which an example embodiment of the present invention is applied to the stationary or hand-held game apparatus is shown. However, an example embodiment of the present invention can be applied to an information processing apparatus, such as a general personal computer, which is operated by an input device having an acceleration sensor included therein and to an information processing apparatus whose body has an acceleration sensor mounted therein. For example, the former information processing apparatus is able to calculate a step count in accordance with acceleration data outputted from the acceleration sensor included in the input device, with the input device attached to or held by a user, and is able to perform a variety of step count calculation processing based on accelerations occurring on the input device. The latter information processing apparatus is only required to have mounted therein an acceleration sensor for detecting accelerations occurring on the body thereof and to execute step count calculation processing in accordance with acceleration data outputted from the acceleration sensor. For example, an example embodiment of the present invention can be applied to a device such as a general personal computer, a mobile telephone, and PDA (Personal Digital Assistant).

For example, in a case where an example embodiment of the present invention is applied to a mobile telephone which includes a communication section for wirelessly communicating with another telephone, an acceleration sensor is mounted on a body of the mobile telephone. When a user makes steps, walks, jogs, runs, or does others with the mobile telephone attached or held, by using values outputted from the acceleration sensor mounted on the mobile telephone, the step count calculation processing is executed. As described above, an example embodiment of the present invention is suitable when applied in a case where a step count made by a user carrying the mobile telephone or the like is measured.

In the above description, the example in which the controller 7 and the game apparatus body 5 are connected through the wireless communication is shown. However, the controller 7 and the game apparatus body 5 may be electrically connected via a cable. In this case, the cable connected to the controller 7 is connected to a joining terminal of the game apparatus body 5.

The shape of the controller 7 as well as the shapes, the number, the installation positions, or the like of the operation sections 72 are merely exemplary ones. Even if the shape of the controller 7 as well as the shapes, the number, the installation positions, or the like of the operation sections 72 are other ones, needless to say, example embodiments of the present invention can be realized. The coefficients, the determination values, the ways shown herein of the calculations, the processing orders, or the like, which are used in the above-described processing, are merely exemplary ones. Even if the coefficients, the determination values, the ways shown herein of the calculations, the processing orders, or the like are other ones, needless to say, example embodiments of the present invention can be realized.

The step count calculation program of an example embodiment of the present invention may be supplied to the game apparatus body 5 not only via an external storage medium such as the optical disc 4, but also via a wired or wireless communication line. Further, the step count calculation program may be prestored in a non-volatile storage device provided within the game apparatus body 5. Note that, an information storage medium for storing the step count calculation program may be a CD-ROM, DVD or other similar optical disc storage medium, or may be a non-volatile semiconductor memory.

The storage medium having the step count calculation program stored therein, the step count calculation apparatus, and the step count calculation system according to an example embodiment of the present invention are able to accurately determine the user's step count by using the data outputted from the acceleration sensor; are useful as a program, an apparatus, and a system for performing game processing, measuring a step count, and performing other information processing in accordance with operations provided on an input device such as a game controller; and are useful as a program, an apparatus, and a system for performing game processing, measuring a step count, and performing other information processing in accordance with operations provided on a body.

While example embodiments of the invention have been described in detail, the foregoing description is in all aspects illustrative and not restrictive. It is understood that numerous other modifications and variations can be devised without departing from the scope of the invention.

What is claimed is:

1. A computer-readable storage medium having stored therein a step count calculation program which is executed by a computer in an apparatus for, by using acceleration data outputted from an acceleration sensor for detecting accelerations acting on a given housing, calculating a number of steps made by a user carrying the housing, the computer-readable storage medium having stored therein the step count calculation program which causes the computer to function as:

acceleration data obtaining means for repeatedly obtaining the acceleration data;

gravity direction acceleration calculation means for, by using the acceleration data obtained by the acceleration data obtaining means, calculating a gravity direction acceleration acting in a gravity direction of the housing;

horizontal direction acceleration calculation means for, by using the acceleration data obtained by the acceleration data obtaining means, calculating a horizontal direction acceleration acting in a horizontal direction perpendicular to the gravity direction of the housing;

first step count calculation means for, by using a first coefficient, calculating a first step count in accordance with a change in the gravity direction acceleration;

second step count calculation means for, by using a second coefficient which is different from the first coefficient, calculating a second step count in accordance with a change in the horizontal direction acceleration; and step count selection means for, based on a predetermined condition, selecting one of the first step count and the second step count as a user's step count.

2. The computer-readable storage medium having stored therein the step count calculation program, according to claim 1, further causing the computer to function as gravity direction calculation means for, by using the acceleration data obtained by the acceleration data obtaining means, calculating the gravity direction of the housing, wherein the gravity direction acceleration calculation means, based on the gravity direction calculated by the gravity direction calculation means, calculates, as the gravity direction acceleration, components of the gravity direction of the acceleration indicated by the acceleration data obtained by the acceleration data obtaining means, and wherein based on the gravity direction obtained by the gravity direction calculation means, the horizontal direction acceleration calculation means calculates, as the horizontal direction acceleration, components of the horizontal direction of the acceleration indicated by the acceleration data obtained by the acceleration data obtaining means.

3. The computer-readable storage medium having stored therein the step count calculation program, according to claim 2, wherein the first step count calculation means, in accordance with a period in which the gravity direction acceleration increases or decreases, calculates the first step count, and wherein the second step count calculation means, in accordance with a period in which the horizontal direction acceleration increases or decreases, calculates the second step count.

4. The computer-readable storage medium having stored therein the step count calculation program, according to claim 3, wherein the first coefficient and the second coefficient are values determined on a condition that the period in which the horizontal direction acceleration increases or decreases is double the period in which the gravity direction acceleration increases or decreases.

5. The computer-readable storage medium having stored therein the step count calculation program, according to claim 3, wherein the first step count calculation means calculates as the first step count a step count which follows at a predetermined rate the step count per unit time, which is calculated based on the period in which the gravity direction acceleration increases or decreases, and wherein the second step count calculation means calculates as the second step count a step count which follows at a predetermined rate the step count per unit time, which is calculated based on the period in which the horizontal direction acceleration increases or decreases.

6. The computer-readable storage medium having stored therein the step count calculation program, according to claim 3, wherein the first step count calculation means includes first attenuation means for attenuating the first step count calculated in previous processing in a case where the period in which the gravity direction acceleration increases or decreases is longer than a predetermined threshold value, and wherein the second step count calculation means includes second attenuation means for attenuating the second step count calculated in the previous processing in a case where the period in which the horizontal direction acceleration increases or decreases is longer than a predetermined threshold value.

7. The computer-readable storage medium having stored therein the step count calculation program, according to claim 3, wherein the first step count calculation means includes first local maximum detection means for detecting local maximums obtained when the gravity direction acceleration increases or decreases, wherein the second step count calculation means includes second local maximum detection means for detecting local maximums obtained when the horizontal direction acceleration increases or decreases, wherein the first step count calculation means calculates the first step count in accordance with a time interval between the local maximums detected by the first local maximum detection means, and wherein the second step count calculation means calculates the second step count in accordance with a time interval between the local maximums detected by the second local maximum detection means.

8. The computer-readable storage medium having stored therein the step count calculation program, according to claim 7, wherein the first step count calculation means calculates the first step count by dividing the first coefficient by the time interval between the local maximums detected by the first local maximum detection means, wherein the second step count calculation means calculates the second step count by dividing the second coefficient by the time interval between the local maximums detected by the second local maximum detection means, and wherein the second coefficient is double the first coefficient.

9. The computer-readable storage medium having stored therein the step count calculation program, according to claim 7, wherein the first local maximum detection means detects the local maximums obtained when an absolute value of the gravity direction acceleration increases or decreases, and wherein the second local maximum detection means detects the local maximums obtained when a magnitude of the horizontal direction acceleration increases or decreases.

10. The computer-readable storage medium having stored therein the step count calculation program, according to claim 7, wherein the first local maximum detection means detects only local maximums, among the local maximums obtained when the gravity direction acceleration increases or decreases, which are greater than or equal to a predetermined reference value, and wherein the second local maximum detection means detects only local maximums, among the local maximums obtained when the horizontal direction acceleration increases or decreases, which are greater than or equal to a predetermined reference value.

11. The computer-readable storage medium having stored therein the step count calculation program, according to claim 3, wherein the first step count calculation means includes:

first local maximum detection means for detecting local maximums obtained when the gravity direction acceleration increases or decreases; and first time interval prediction means for, in accordance with a magnitude of the gravity direction acceleration, predicting a time interval from a time point when the first local maximum detection means detects an immediately preceding local maximum to a time point when the first local maximum detection means detects a next local maximum, wherein the second step count calculation means includes:

second local maximum detection means for detecting local maximums obtained when the horizontal direction acceleration increases or decreases; and second time interval prediction means for, in accordance with a magnitude of the horizontal direction acceleration, predicting a time interval from a time point when the second local maximum detection means detects an immediately preceding local maximum to a time point when the second local maximum detection means detects a next local maximum, wherein the first step count calculation means calculates the first step count in accordance with the time interval predicted by the first time interval prediction means, and wherein the second step count calculation means calculates the second step count in accordance with the time interval predicted by the second time interval prediction means.

12. The computer-readable storage medium having stored therein the step count calculation program, according to claim 2, wherein the gravity direction calculation means calculates, as the gravity direction of the housing, a direction of a vector which follows at a predetermined rate a vector of the acceleration indicated by the acceleration data obtained by the acceleration data obtaining means.

13. The computer-readable storage medium having stored therein the step count calculation program, according to claim 12, wherein based on the gravity direction calculated by the gravity direction calculation means, the gravity direction acceleration calculation means calculates, as the gravity direction acceleration, components of the gravity direction obtained after the following vector has been subtracted from the vector of the acceleration indicated by the acceleration data obtained by the acceleration data obtaining means, and wherein based on the gravity direction calculated by the gravity direction calculation means, the horizontal direction acceleration calculation means calculates, as the horizontal direction acceleration, components of the horizontal direction of the acceleration obtained after the following vector has been subtracted from the vector of the acceleration indicated by the acceleration data obtained by the acceleration data obtaining means.

14. The computer-readable storage medium having stored therein the step count calculation program, according to claim 1, wherein the first time interval prediction means predicts the time interval by using a magnitude of the immediately preceding local maximum detected by the first local maximum detection means and a change amount of a value of the gravity direction acceleration, and wherein the second time interval prediction means predicts the time interval by using a magnitude of the immediately preceding local maximum detected by the second local maximum detection means and a change amount of a value of the horizontal direction acceleration.

15. The computer-readable storage medium having stored therein the step count calculation program, according to claim 1, wherein the step count selection means compares the first step count and the second step count and selects to use one of the first step count and the second step count, whichever is larger than another of the first step count and the second step count.

16. The computer-readable storage medium having stored therein the step count calculation program, according to claim 1, wherein the step count selection means includes:

first amplitude detection means for detecting a first amplitude at which the gravity direction acceleration increases or decreases;

second amplitude detection means for detecting a second amplitude at which the horizontal direction acceleration increases or decreases; and ratio calculation means for calculating a ratio between the first amplitude and the second amplitude, and wherein when the first amplitude is larger than an amplitude which is obtained by multiplying the second amplitude by a predetermined ratio, the step count selection means selects to use the first step count, and when the first amplitude is less than or equal to the amplitude which is obtained by multiplying the second amplitude by the predetermined ratio, the step count selection means selects to use the second step count.

17. The computer-readable storage medium having stored therein the step count calculation program, according to claim 1, wherein the step count selection means includes accumulated step count calculation means for calculating an accumulated step count by sequentially accumulating one of the selected first step count and the selected second step count.

18. A step count calculation apparatus for calculating a number of steps made by a user carrying the step count calculation apparatus, comprising:

an acceleration sensor for detecting accelerations acting on an apparatus body and for outputting acceleration data;

a display section provided on the apparatus body;

acceleration data obtaining means for repeatedly obtaining the acceleration data;

gravity direction acceleration calculation means for, by using the acceleration data obtained by the acceleration data obtaining means, calculating a gravity direction acceleration acting in a gravity direction of the apparatus body;

horizontal direction acceleration calculation means for, by using the acceleration data obtained by the acceleration data obtaining means, calculating a horizontal direction acceleration acting in a horizontal direction perpendicular to the gravity direction of the apparatus body;

first step count calculation means for, by using a first coefficient, calculating a first step count in accordance with a change in the gravity direction acceleration;

second step count calculation means for, by using a second coefficient which is different from the first coefficient, calculating a second step count in accordance with a change in the horizontal direction acceleration;

step count selection means for, based on a predetermined condition, selecting one of the first step count and the second step count as a user's step count; and display control means for displaying, on the display section, information in accordance with the step count selected by the step count selection means.

19. A step count calculation system, including a hand-held unit which is capable of being carried by a user and a body unit which is connected to the hand-held unit via one of wired communication and wireless communication, for calculating a step count made by the user carrying the hand-held unit, the step count calculation system comprising:

an acceleration sensor for detecting accelerations acting on a body of the hand-held unit and for outputting acceleration data;

acceleration data obtaining means for obtaining the acceleration data from the acceleration sensor;

gravity direction acceleration calculation means for, by using the acceleration data obtained by the acceleration data obtaining means, calculating a gravity direction acceleration acting in a gravity direction of the hand-held unit;

horizontal direction acceleration calculation means for, by using the acceleration data obtained by the acceleration data obtaining means, calculating a horizontal direction acceleration acting in a horizontal direction perpendicular to the gravity direction of the hand-held unit;

first step count calculation means for, by using a first coefficient, calculating a first step count in accordance with a change in the gravity direction acceleration;

second step count calculation means for, by using a second coefficient which is different from the first coefficient, calculating a second step count in accordance with a change in the horizontal direction acceleration;

step count selection means for, based on a predetermined condition, selecting one of the first step count and the second step count as a user's step count; and display control means for displaying, on a display section, information in accordance with the step count selected by the step count selection means.

* * * * *